US011989681B2

(12) United States Patent
Purohit

(10) Patent No.: US 11,989,681 B2
(45) Date of Patent: May 21, 2024

(54) SYSTEM FOR TRAVEL PLAN BASED SHIPMENTS

(71) Applicant: Dilip Shriram Purohit, Northridge, CA (US)

(72) Inventor: Dilip Shriram Purohit, Northridge, CA (US)

( * ) Notice: Subject to any disclaimer, the term of this patent is extended or adjusted under 35 U.S.C. 154(b) by 0 days.

(21) Appl. No.: 17/695,123

(22) Filed: Mar. 15, 2022

(65) Prior Publication Data
US 2023/0297933 A1 Sep. 21, 2023

(51) Int. Cl.
G06Q 10/083 (2023.01)
B07C 3/08 (2006.01)
B07C 3/10 (2006.01)

(52) U.S. Cl.
CPC ............ *G06Q 10/083* (2013.01); *B07C 3/08* (2013.01); *B07C 3/10* (2013.01)

(58) Field of Classification Search
CPC ............ G06Q 10/083; B07C 3/08; B07C 3/10
USPC ........................................................ 705/330
See application file for complete search history.

(56) References Cited

U.S. PATENT DOCUMENTS

| | | | |
|---|---|---|---|
| 6,738,975 B1 | 5/2004 | Yee et al. | |
| 7,013,589 B2 | 3/2006 | Dickinson et al. | |
| 7,614,552 B2 | 11/2009 | Roseman et al. | |
| 8,285,571 B2 | 10/2012 | Demirdjian et al. | |
| 9,092,817 B2 | 7/2015 | Allocca et al. | |
| 9,390,103 B2 | 7/2016 | Peng | |
| 9,639,883 B2 | 5/2017 | Loui et al. | |
| 9,904,900 B2 | 2/2018 | Cao | |
| 10,148,656 B2 | 12/2018 | Zimberoff et al. | |
| 10,332,060 B2 | 6/2019 | Tian et al. | |
| 10,354,312 B2 | 7/2019 | Bhosle et al. | |

(Continued)

FOREIGN PATENT DOCUMENTS

| | | |
|---|---|---|
| EP | 2162856 A1 | 3/2010 |
| EP | 2248087 A1 | 11/2010 |

(Continued)

OTHER PUBLICATIONS

"A Novel Modeling Approach for Express Package Carrier Planning" Published by Department of Industrial and Operations Engineering, University of Michigan, Ann Arbor (Year: 2008).*

*Primary Examiner* — Zeina Elchanti

(57) ABSTRACT

A system described herein comprises a database of transporter profiles, a database of shipping package profiles, a control circuit, a geolocation device, and a physical kiosk. The transporter profiles comprise scheduled travel events associated therewith, and the transporter profiles being associated with transporters. The shipping packages comprises scheduled shipping events. The control circuit is operable to identify one or more suggested shipping packages for a transporter, based in part, on comparisons between the one or more scheduled travel events of a transporter profile associated with the transporter and the one or more scheduled shipping events of the shipping packages. The geolocation device is operable to calculate in real-time an absolute position of a transporter computing device associated with the transporter and estimate time of arrival of the transporter at a transport terminal. The physical kiosk delivers the suggested shipping packages prior to the transporter arriving at the transport terminal.

17 Claims, 11 Drawing Sheets

(56) References Cited

U.S. PATENT DOCUMENTS

| | | |
|---|---|---|
| 10,783,480 B1 | 9/2020 | Reiss et al. |
| 2002/0049622 A1 | 4/2002 | Lettich et al. |
| 2005/0209932 A1 | 9/2005 | Hui |
| 2009/0222351 A1* | 9/2009 | Wang ................. G06Q 30/0272 |
| | | 235/377 |
| 2009/0222354 A1* | 9/2009 | Murphy ............ G06V 30/1456 |
| | | 382/229 |
| 2010/0262475 A1 | 10/2010 | Gavriline et al. |
| 2013/0006805 A1 | 1/2013 | Ulli |
| 2015/0106296 A1* | 4/2015 | Robinson ........... G06Q 10/0838 |
| | | 705/339 |
| 2015/0287084 A1 | 10/2015 | Gura et al. |
| 2015/0348111 A1 | 12/2015 | Davis |
| 2016/0364679 A1 | 12/2016 | Cao |
| 2017/0032450 A1 | 2/2017 | Jia et al. |
| 2017/0220966 A1 | 8/2017 | Wang |
| 2019/0130462 A1 | 5/2019 | Tietzen et al. |
| 2020/0027109 A1 | 1/2020 | Glasgow |
| 2020/0042935 A1 | 2/2020 | Kriss |

FOREIGN PATENT DOCUMENTS

| | | |
|---|---|---|
| WO | 2014/127444 A1 | 8/2014 |
| WO | 2016060377 A1 | 4/2016 |

\* cited by examiner

SYSTEM FOR TRAVEL PLAN BASED SHIPMENTS

FIELD OF THE INVENTION

The present disclosure relates broadly to a consignment shipment system, and more particularly to a system that assigns shipping consignments to transporters based on their travel plans.

BACKGROUND

"With the rise of social media and online technologies, digital marketing has gradually earned itself a prominent position in the online business sector. Such technologies have allowed new waves of entrepreneurs and businesses to join the market. Many artists, artisans and service providers are among those enjoying the convenience and benefits of digital marketing. Numerous industries have been known to offer a safe marketplace for their users to sell and promote their businesses, with the largest sectors being clothing, shoes, and sneakers industries." [Source: How Small Businesses Can Benefit From Online Marketplace; Mar. 29, 2019].

"Without a physical store, many businesses would've struggled to even start working, but thanks to the internet and online marketplaces, several successful brands have made profit selling and advertising their merchandise. There are several reasons why young businesses are turning to e-commerce and online marketplaces for increased profit"; "It is important to remember that owning a website for the brand you're selling is great, but investing in a marketplace store can be a game changer for your business. It can help not only boost your client base but also help your business find new customers just by being within reach of multiple buyers online. Marketplaces create a sense of community on a global scale. While they are not usually aimed at certain niches, the customers not necessarily browsing for your product may get interested after passing by your online store and deciding to peek in for a closer look. You can multiply the sales of your shoes and sneakers by having an online store in a marketplace full of potential buyers, so take your designs online and get the recognition your brand deserves." [Source: How Small Businesses Can Benefit From Online Marketplace; Mar. 29, 2019].

"Imagine that a brick-and-mortar business owner wants to start selling products online. After a cursory online search, he or she might come across confusing and intimidating terms like domain registration, web hosting, and search engine optimization. The business owner might then start adding up the cost and time commitment required to get started and decide that they're not comfortable getting started with selling their products online. Unfortunately, this is a common scenario that leads to many small business owners abandoning their hopes of selling online. The reality is that there are many different ways to sell products and services online—and not all of them require a website." [Source: Do You Even Need a Website to Sell Your Products? Feb. 12, 2018].

Further, "Freight transportation is a primary component of all supply-chain and logistics systems. However, the cost of moving commodities between cities and countries is borne not only by direct stakeholders (shippers, carriers, or consignees) but also by other members of society who may not benefit directly from these movements. In economics literature, this is referred to as the external cost of an activity. Air, noise, and water pollution; vegetation and wildlife destruction; and road accidents are some of the negative impacts of freight transportation. Freight movements and their associated negative impacts have been steadily increasing over the last few decades in most parts of the world. Negative environmental effects of freight transportation are a serious concern, because of the associated long-term direct and indirect impacts such as increasing greenhouse gases (GHGs) and global warming.

External or social costs of freight transportation have received increased attention recently in development strategies because of sustainability issues. A widely accepted definition of sustainable development is "development that meets the needs of the present without compromising the ability of future generations to meet their own needs" [1]. Strategies for sustainable transportation consider economic development, environmental preservation, and social development [2]. But as the negative impacts of freight transportation increase, achieving sustainability goals becomes ever more challenging.

In general economic terms, the external costs of a product or service can be a source of market failure because these occur outside the market. It is desirable to internalize all costs of transportation, first because the demand-and-supply equilibrium will occur at a more sustainable level, and second because providers are more likely to be more responsible for their decisions and customers will use the services more efficiently. It is also important for governments to know to what extent stakeholders cover the costs when designing taxation and regulation policies." [Source: Freight Transportation Externalities; Fatemeh Ranaiefar, AmeliaRegan, in Logistics Operations and Management, 2011].

Therefore, there is a long-felt need for a system that assigns a system that assigns shipping consignments to transporters based on their travel plans.

SUMMARY

In an aspect a system is described. The system comprises a physical kiosk, a control circuit, and a geolocation device. The physical kiosk is communicatively coupled to a control circuit and a geolocation device. The physical kiosk positioned at a transport terminal being designated for a transporter. The control circuit is configured to perform the steps of: maintaining a database of transporter profiles, maintaining a database of shipping package profiles; and accessing the database of transporter profiles and the database of shipping package profiles and identifying a suggested shipping package for the transporter, in part, on comparisons between the scheduled travel event of the transporter profile associated with the transporter and the scheduled shipping event of the shipping package profile. The transporter profile of the database of transporter profiles comprises a scheduled travel event associated therewith, and the transporter profile being associated with the transporter. The shipping package profile of the database of shipping package profiles comprising a scheduled shipping event associated with a shipping package. The geolocation device operable to calculate in real-time an absolute position of a transporter computing device associated with the transporter and estimate time of arrival of the transporter at the transport terminal; and communicate a signal to the physical kiosk to dispatch the suggested shipping package prior to the transporter arriving at the transport terminal.

In an embodiment, the transporter profiles comprise a profile associated with the transporter.

In another embodiment, the scheduled travel event comprises information regarding at least a mode of transport, an origin location, an intermediary location, a destination location, a date of travel, a time of travel, a duration of travel, a halt location, a halt duration, a halt time, a mode of transport, accompaniers details, and luggage space in a planned travel event.

In yet another embodiment, the shipping package comprises at least one of an item, a package and a consignment that is to be shipped from an origin location to a destination location.

In yet another embodiment, the suggested shipping package comprises the shipping package that is identified and suggested to the transporter.

In yet another embodiment, the scheduled shipping event comprises shipping information of the shipping package.

In yet another embodiment, the shipping information of the shipping package comprises a mode of transport, an origin location, a destination location, an intermediary location, a shipping package size, a shipping package volume, a material type, a pick-up date, a pick-up time, a pick-up location, a drop date, a drop time, a drop location, a halt time, and a halt duration.

In yet another embodiment, the transport terminal comprises at least one of a road transport terminal, a water transport terminal, a railway terminal, a heliport terminal, and an airport terminal.

In yet another embodiment, the control circuit comprises one of a microprocessor, a computer, and a processor based device.

In yet another embodiment, the control circuit comprises a server.

In yet another embodiment, the transporter computing device comprises a personal digital assistant device associated with the transporter.

In yet another embodiment, the physical kiosk comprises a disposal bin where the transporter deposits an unwanted suggested shipping package among the suggested shipping package, the disposal bin comprising a bin sensor operable to detect placement of the unwanted suggested shipping package.

In yet another embodiment, the system further comprises a package support system and a package routing system communicatively coupled to the control circuit, the package support system operable to present the shipping package to the transporter.

In yet another embodiment, the control circuit is further operable to receive identification information of the unwanted suggested shipping package from the bin sensor; and update the database of transporter profiles based, in part, on the transporter associated with the transporter profile, on placing one of the unwanted suggested shipping packages in the disposal bin.

In yet another embodiment, the control circuit is further operable to receive a package information query from the transporter computing device; identify the shipping package among the shipping package in the database of shipping package profiles comprising package attributes corresponding to the package information query received; and instruct the physical kiosk to physically present the identified shipping package by loading the shipping package of the identified one or more shipping packages onto the physical kiosk by a retrieval device of an automated loading system, for physical presentation to the transporter at the transport terminal.

In yet another embodiment, the physical kiosk comprises a package receiving unit that receives the shipping package through a conveyor; a dimensions determination unit that captures an image of the shipping package and determines dimensions of the shipping package; a package weight determination unit that determines a weight of the shipping package; a material detection unit that scans the shipping package and determines whether at least one of an explosive material, an inflammable material, a flammable material, a combustible material, is at least one of associated and contained within the shipping package; and a security verification unit that analyses the shipping package and provides a recommendation whether the shipping package passes through a security check at the transport terminal.

In yet another embodiment, the physical kiosk further comprises a material characteristics detecting unit that detects whether an item in the shipping package is at least one of fragile, non-fragile, perishable, transparent, brittle, ductile, liquid, hard, granular, spillable, and tensile.

In yet another embodiment, the security verification unit comprises at least one of a chemical detector, a millimeter wave scanner, an x-ray detector, and an automatic target recognition unit.

In yet another embodiment, the dimensions determination unit determining the dimensions of the shipping package comprises identifying at least one of boundaries and edges of the shipping package from the image of the shipping package; calculating image coordinates from the boundaries and the edges identified; determining real world coordinates using the image coordinates; and determining the dimensions of the shipping package from the real world coordinates. The dimensions of the shipping package comprise length, width, and height of the shipping package.

In yet another embodiment, the package weight determination unit comprises at least one of a weighing scale, a weight sensor, and a load cell.

In yet another embodiment, the control circuit is operable to receive shipping information of the shipping package from a sender; receive at least one of dimensions, a weight, and a type of an item in the shipping package from the system; and record the shipping information, the dimensions, the weight, and the type of the item to the shipping package in the database of shipping package profiles.

In yet another embodiment, the physical kiosk comprises a shipping label preparing unit operable to receive shipping information of the shipping package, and at least one of the dimensions, the weight, and a type of an item in the shipping package; extract at least an origin location, a destination location, an intermediary location, a shipping date, and a shipping time from the shipping information; and preparing a shipping label comprising information of at least the origin location, the destination location, the intermediary location, the shipping date, the shipping time, and the type of the item.

In yet another embodiment, the shipping label preparing unit is further operable to prepare the shipping label comprising handle with care instructions, using artificial intelligence techniques, based on information of the type of the item.

In yet another embodiment, the physical kiosk further comprises a shipping label printer adapted to print a shipping label on the shipping package.

In yet another embodiment, the security verification unit is operable to retrieve attributes of the shipping package from the database of shipping package profiles, wherein the attributes comprise at least the dimensions, the weight, and a type of an item; compare prestored attributes and the attributes of the shipping package; and provide the recommendation whether the shipping package passes through the security check at the transport terminal.

In yet another embodiment, the prestored attributes comprises attributes of a security check passed shipping package.

In yet another embodiment, the material characteristics detecting unit is operable to transmit a signal into the shipping package; analyze a return signal from the shipping package; and determine a type of the item in the shipping package based on analyzing the return signal.

In yet another embodiment, the control circuit is operable to extract scheduled travel event information of the transporter from the transporter computing device, and update the transporter profile of the transporter in the database of transporter profiles using the extracted scheduled travel event information. The transporter computing device comprises at least one ticket booking confirmation notification.

In yet another embodiment, the system further comprises a database of sender profiles, a sender profile comprising a shipping requirement and the sender profile being associated with a sender.

In yet another embodiment, the sender is one who logs in the shipping requirements and sends at least one of a consignment, a product, an item, a package, and goods from an origin location to a destination location.

In yet another embodiment, the transporter is one who carries at least one of a consignment, a product, an item, a package, goods, and passenger from an origin location to a destination location.

In yet another embodiment, the system further comprises a database of passenger profiles, a passenger profile comprising a scheduled travel plan associated therewith and the passenger profile being associated with a passenger; and the control circuit operable to access the database of transporter profiles and the database of passenger profiles, and operable to identify a suggested transporter for the passenger on comparisons between the scheduled travel plan of the passenger profile associated with the passenger and the scheduled travel event of the transporter.

In yet another embodiment, the control circuit is operable to determine and communicate a travel date, a travel time, a pickup date, a pickup time, a pickup location, a drop location, a drop date, a drop time based on comparisons between the scheduled travel plan of the passenger profile associated with the passenger and the scheduled travel event of the transporters.

In yet another embodiment, the system further comprises a database of business profiles, a business profile comprising at least one content related to a business of a seller; and the control circuit operable to access the database of business profiles.

In yet another embodiment, the control circuit is operable to obtain information from the seller; create a business profile based on the information obtained from the seller; generate a service information page of the business based on the information obtained from the seller; record the business profile in the database of business profiles; record details of the seller and the buyer under an account of the seller and the buyer respectively; and render the service information page of the business to the buyer when the buyer accesses the business profile of the business. The information is related to a business of the seller comprising a geolocation information, and at least one of a name, a business type, a logo, a business catalog, pricing information, preference information, business offers, web page information, and business information. The business profile comprises the at least one content related to the business. The service information page is generated instantly when a buyer accesses the business profile of the business.

In yet another embodiment, the geolocation information comprises a location of the business at one or more levels.

In yet another embodiment, the one or more levels comprises at least one of a continent level, a country level, a regional level, a state level, a city level, a district level, a town level, and a street level.

In yet another embodiment, the control circuit is further operable to: monitor a business management function of the business profile; and automatically coordinate and manage the business management function digitally at backend based on at least one of transactions, the information obtained from the seller, and the business information.

In yet another embodiment, the business management function comprises at least one of an inventory management function, human resource management function, employee management function, customer relationship management (CRM) function, payroll management function, supply chain management function, contact management function, finance management function, promotions and advertisement management function, and shipping management function.

In yet another embodiment, the control circuit is operable to enable interaction between the seller and the buyer. The interaction comprises at least one of an audio interaction, a video interaction, and a text interaction.

In yet another embodiment, the scheduled travel event comprises a carriable shipment volume, a carriable shipment weight, a carriable shipment type, a travel date, a travel duration, accompaniers information, an origin location, an intermediary location, a destination location, a mode of transport, a vehicle information, a halt time, a halt duration, a travel route, an estimated departure time, and an estimated destination arrival time.

In yet another embodiment, the scheduled travel event further comprises information of quoted shipping charges.

In yet another embodiment, the control circuit is operable to enable interaction between the seller, the buyer, the transporter, and a passenger. The interaction comprises at least one of an audio interaction, a video interaction, and a text interaction.

In yet another embodiment, the control circuit is operable to render a post page to at least one product and at least one service offered by the business of the seller; and enable at least one of the seller, the transporter, and a passenger to provide at least one of a comment, an opinion, a rating, a suggestion, a advice, and a review on at least one of the product, and the service on the post page.

In yet another embodiment, the control circuit is operable to calculate a popularity score of at least one of the product, and the service based on at least one of the comment, the opinion, the rating, the suggestion, the advice, and the review; and render the popularity score of at least one of the product, and the service.

In yet another embodiment, the at least one content comprises at least one of an advertisement, an audio, a video, a snippet, a notification, an offer, and a promotion.

In yet another embodiment, the control circuit is further operable to: dynamically update the service information page of the business based on the business management function; and render the service information page of the business to the buyer when the buyer accesses the business profile.

In yet another embodiment, the service information page comprises at least one of a color, the logo, a symbol, a tagline, a feel, an audio, a tone, a look, and a page frame that reminds identity of the business of the seller.

In yet another embodiment, the preference information comprises information indicating a consent for an advertisement.

In yet another embodiment, the control circuit is further operable to: advertise a second business profile within a first business profile of the seller when the preference information of the seller indicates a consent for an advertisement.

In yet another embodiment, the control circuit is further operable to: match shipping information of a product ordered, and shipping log of at least one external shipping service; and automatically assign a consignment to the at least one external shipping service based on the matching.

In yet another embodiment, the control circuit is operable to: provide at least one search field, via a user interface, that enables a buyer to digitally search at least one of (a) a business profile, and at least one of (b) a product and a service of a business of the seller, wherein the at least one search field comprises a geolocation-based search field; obtain an input from the buyer on the at least one search field; record details of the buyer under an account of the buyer; retrieve at least one of (a) the business profile, and at least one of (b) the product and the service of the business based on the input; and render a service information page of the business to the buyer when the buyer accesses the business profile. The service information page is generated instantly that enables the buyer to perform at least one of at least one action item of ecommerce.

In yet another embodiment, the at least one search field comprises a town-based search field, a street-based search field, a district-based search field, a city-based search field, a state-based search field, a region-based search field, a country-based search field, a continent based search field, a zip-code based search field, a name-based search field, a business type-based search field, a brand-based search field, a price-based search field, an offer-based search field, and a product-based search field.

In yet another embodiment, the control circuit is operable to enable the buyer to one of avail and buy at least one of the product, and the service from the business profile associated with different geolocations; control shopping cart outside the business profile; and perform transactions integrated of a first business profile and a second business profile at an instant.

In yet another embodiment, the control circuit is operable to enable the buyer to perform a consolidated payment through a buyer computing device, in a home currency of the buyer, outside the business profile for a purchase of the product.

In yet another embodiment, the control circuit is operable to enable the buyer to search and retrieve at least one of (a) the product, and (b) the service specifically from a first business profile by providing the input on the at least one search field.

In yet another embodiment, the control circuit is further operable to: render a video tour of the business to the buyer based on the input. The video tour displays the business profile, the product, and the service offered.

In yet another embodiment, the control circuit is further operable to: obtain preference information of the buyer. The preference information comprises information indicating at least one of a consent to be a carrier, a consent to carry additional shipment, and a consent to be a driver.

In another aspect, a method is described. The method comprises: designating a physical kiosk, positioned at a transport terminal, for a transporter; maintaining a database of transporter profiles; maintaining a database of shipping package profiles; accessing, via a control circuit, the database of transporter profiles and the database of shipping package profiles and identifying a suggested shipping package for the transporter, in part, on comparisons between the scheduled travel event of the transporter profile associated with the transporter and the scheduled shipping event of the shipping package profile; calculating, via a geolocation device, in real-time an absolute position of a transporter computing device associated with the transporter and estimate time of arrival of the transporter at the transport terminal; and communicating, via the geolocation device, a signal to the physical kiosk to dispatch the suggested shipping package prior to the transporter arriving at the transport terminal. The transporter profile of the database of transporter profiles comprising a scheduled travel event associated therewith and the transporter profile being associated with the transporter. A shipping package profile of the database of shipping package profiles comprising a scheduled shipping event associated with a shipping package.

In an embodiment, the transporter profile comprise a profile associated with the transporters.

In another embodiment, the scheduled travel event comprises information regarding at least an origin location, an intermediary location, a destination location, a date of travel, a time of travel, a duration of travel, a halt location, a halt duration, a halt time, a mode of transport, accompaniers details, and luggage space in a planned travel event.

In yet another embodiment, the shipping package comprises at least one of an item, a package and a consignment that is to be shipped from an origin location to a destination location.

In yet another embodiment, the suggested shipping package comprises the shipping package that is identified and suggested to the transporter.

In yet another embodiment, the scheduled shipping event comprises shipping information of the shipping package.

In yet another embodiment, the shipping information of the shipping package comprises a mode of transport, an origin location, a destination location, an intermediary location, a pick-up date, a pick-up time, a pick-up location, a drop date, a drop time, a drop location, a halt time, and a halt duration.

In yet another embodiment, the transport terminal comprises at least one of a road transport terminal, a water transport terminal, a railway terminal, a heliport terminal, and an airport terminal.

In yet another embodiment, the control circuit comprises one of a microprocessor, a computer, and a processor based device.

In yet another embodiment, the control circuit comprises a server.

In yet another embodiment, the transporter computing device comprises a personal digital assistant device associated with the transporter.

In yet another embodiment, the method further comprises maintaining a database of passenger profiles; and accessing, via the control circuit, the database of transporter profiles and the database of passenger profiles, and identifying a suggested transporter for the passenger on comparisons between the scheduled travel plan of the passenger profile associated with the passenger and the scheduled travel event of the transporter. The passenger profile comprising a scheduled travel plan associated therewith and the passenger profile being associated with a passenger.

In yet another embodiment, the method further comprises: maintaining a database of business profiles, a business profile comprising at least one content related to a business of a seller; and accessing, via the control circuit, the database of business profiles.

In yet another embodiment, the method further comprises: obtaining information from the seller; creating a business profile based on the information obtained from the seller, wherein the business profile comprise at least one content related to the business; generating a service information page of the business based on the information obtained from the seller; recording the business profile in the database of business profiles; recording details of the seller and the buyer under an account of the seller and the buyer respectively; and rendering the service information page of the business to the buyer when the buyer accesses the business profile of the business. The information is related to a business of the seller comprising a geolocation information, and at least one of a name, a business type, a logo, a business catalog, pricing information, preference information, business offers, web page information, and business information. The service information page is generated instantly when a buyer accesses the business profile of the business.

In yet another embodiment, the method further comprises: providing at least one search field, via a user interface, that enables a buyer to digitally search at least one of (a) a business profile, and at least one of (b) a product and a service of the business of the seller; obtaining an input from the buyer on the at least one search field; recording details of the buyer under an account of the buyer; retrieving at least one of (a) the business profile, and at least one of (b) the product and the service of the business based on the input; and rendering a service information page of the business to the buyer when the buyer accesses the business profile. The service information page is generated instantly that enables the buyer to perform at least one of at least one action item of ecommerce. The at least one search field comprises a geolocation-based search field.

In yet another aspect, a non-transitory computer storage medium storing a sequence of instructions is disclosed. The non-transitory computer storage medium storing a sequence of instructions, which when executed by a processor causes: designating a physical kiosk, positioned at a transport terminal, for a transporter; maintaining a database of transporter profiles; maintaining a database of shipping package profiles; accessing, via a control circuit, the database of transporter profiles and the database of shipping package profiles and identifying a suggested shipping packages for the transporter, in part, on comparisons between the scheduled travel event of the transporter profile associated with the transporter and the scheduled shipping event of the shipping package; calculating, via a geolocation device, in real-time an absolute position of a transporter computing device associated with the transporter and estimate time of arrival of the transporter at a transport terminal; and communicating a signal to the physical kiosk to dispatch the suggested shipping package prior to the transporter arriving at the transport terminal. The transporter profile comprising a scheduled travel event associated therewith and the transporter profile being associated with transporter. A shipping package profile comprising a scheduled shipping event of a shipping package.

In an embodiment, the non-transitory computer storage medium further causes maintaining a database of passenger profiles; and accessing, via the control circuit, the database of transporter profiles and the database of passenger profiles, and identifying a suggested transporter for the passenger on comparisons between the scheduled travel plan of the passenger profile associated with the passenger and the scheduled travel event of the transporter. The passenger profile comprising a scheduled travel plan associated therewith and the passenger profile being associated with a passenger.

In another embodiment, the non-transitory computer storage medium further causes: maintaining a database of business profiles, a business profile comprising at least one content related to a business of a seller; and accessing, via the control circuit, the database of business profiles.

In another embodiment, the non-transitory computer storage medium further causes: obtaining information from a seller; creating a business profile based on the information obtained from the seller, wherein the business profile comprise at least one content related to the business; generating a service information page of the business based on the information obtained from the seller; recording the business profile in the database of business profiles; recording details of the seller and the buyer under an account of the seller and the buyer respectively; and rendering the service information page of the business to the buyer when the buyer accesses the business profile of the business. The information is related to a business of the seller comprising a geolocation information, and at least one of a name, a business type, a logo, a business catalog, pricing information, preference information, business offers, web page information, and business information. The service information page is generated instantly when a buyer accesses the business profile of the business.

In yet embodiment, the non-transitory computer storage medium further causes: providing at least one search field, via a user interface, that enables a buyer to digitally search at least one of (a) a business profile, and at least one of (b) a product and a service of the business of the seller; obtaining an input from the buyer on the at least one search field; recording details of the buyer under an account of the buyer; retrieving at least one of (a) the business profile, and at least one of (b) the product and the service of the business based on the input; and rendering a service information page of the business to the buyer when the buyer accesses the business profile. The service information page is generated instantly that enables the buyer to perform at least one of at least one action item of ecommerce. The at least one search field comprises a geolocation-based search field.

The methods and systems disclosed herein may be implemented in any means for achieving various aspects and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

In the present disclosure, reference is made to the accompanying drawings, which form a part hereof. In the drawings, similar symbols typically identify similar components, unless context dictates otherwise. Various embodiments described in the detailed description, and drawings, are illustrative and not meant to be limiting. Other embodiments may be used, and other changes may be made, without departing from the spirit or scope of the subject matter presented herein. It will be understood that the aspects of the present disclosure, as generally described herein, and illustrated in the Figures, can be arranged, substituted, combined, separated, and designed in a wide variety of different configurations, all of which are contemplated herein. The embodiments are illustrated by way of example and not limitation in the figures of the accompanying drawings, in which like references indicate similar elements and in which.

Figure 1:
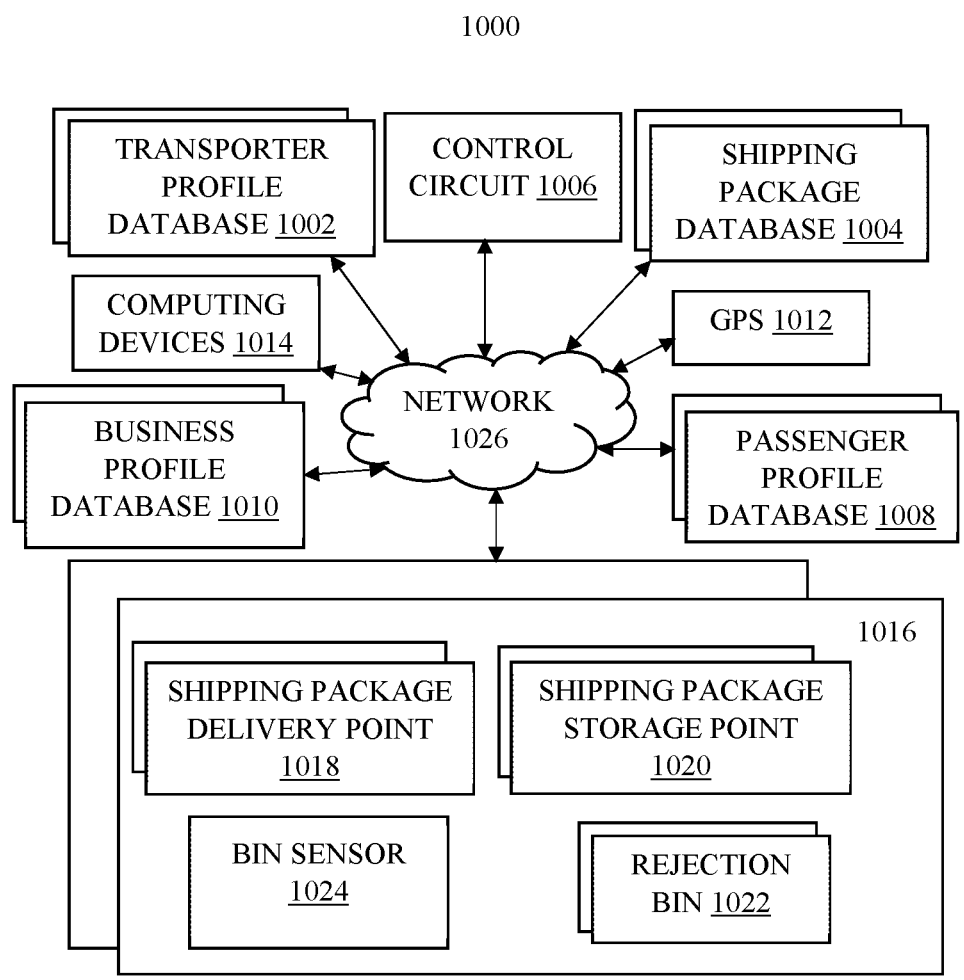
FIG. 1 illustrates a block diagram of an ecommerce system, according to some embodiments.

Other features of the present embodiments will be apparent from the accompanying drawings and from the detailed description that follows.

DETAILED DESCRIPTION

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

The articles "a" and "an" are used herein refers to one or to more than one (i.e., to at least one) of the grammatical object of the article. By way of example, "an element" means one element or more than one element.

No element, act, or instruction used herein should be construed as critical or essential unless explicitly described as such. Also, as used herein, the articles "a" and "an" are intended to include items, and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term in this written description, like "comprising" or "including," it is understood that direct support should also be afforded to "consisting essentially of" language as well as "consisting of" language as if stated explicitly and vice versa.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Reference throughout this specification to "an example", "an instance", "for example" means that a particular feature, structure, or characteristic described in connection with the example is included in at least one embodiment. Thus, appearances of the phrases "in an example" in various places throughout this specification are not necessarily all referring to the same embodiment.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example without limitation, a PLC (Programmable Logic Controller), an FPGA (field programmable gate array), an ASIC (application specific integrated circuit), Application specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., Erasable Programmable Read-only Memory (EPROM), Electronically Erasable Programmable Read-Only Memory (EEPROM), and flash memory devices; magnetic disks, e.g., internal hard disks or removable disks; magneto optical disks; and compact disc read-only memory (CD ROM) and Digital Versatile Disk-Read Only Memory (DVD-ROM) disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a backend component, e.g., as a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Embodiments of the present disclosure may comprise or utilize a special purpose or general-purpose computer including computer hardware. Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media.

Computer-readable media that carry computer-executable instructions are transmission media. Thus, by way of example, and not limitation, embodiments of the disclosure can comprise at least two distinctly different kinds of computer-readable media: physical computer-readable storage media and transmission computer-readable media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described. Rather, the described features and acts are disclosed as example forms of implementing the claims.

Physical computer-readable storage media includes RAM, ROM, Electronically Erasable Programmable Read-Only Memory (EEPROM), CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network, such as a 5G network, or another communications connection (either hardwired, wireless, or a combination of hardwired or wireless) to a computer, the computer properly views the connection as a transmission medium. Transmission media can include a network and/or data links which can be used to carry data or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a Network interface controller (NIC)), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject is not necessarily limited to the described features or acts described above. Rather, the described features and acts are disclosed as example forms of implementing subject matter.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Even though particular combinations of features are disclosed in the specification, these combinations are not intended to limit the disclosure of possible implementations. Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

An initial overview of technology embodiments is provided below, and specific technology embodiments are then described in further detail. This initial summary is intended to aid readers in understanding the technology more quickly but is not intended to identify key or essential technological features, nor is it intended to limit the scope of the claimed subject matter.

The embodiments herein and the various features and advantageous details thereof are explained more fully with reference to the non-limiting embodiments that are illustrated in the accompanying drawings and detailed in the following description.

In order to fully understand the scope of the invention, the following terms used herein are hereby defined.

As used herein, the term "control circuit" refers broadly to any microcontroller, computer, or processor-based device with processor, memory, and programmable input/output peripherals, which is generally designed to govern the operation of other components and devices. The control circuit further comprises common accompanying accessory devices. The control circuit may be coupled to a database system comprising one or more databases. The control circuit may access information recorded within the one or more databases and perform one or more intended tasks. The control circuit communicates with other components using transceivers through a network. The network may be wired network or wireless network. The control circuit further comprises input and output devices. The control circuit may be a server. The server may be a physical server or a cloud server.

As used herein, the term "transporter" refers to one who travels from an origin location to a destination location and carries at least one of cargo, luggage, and passengers. The transporter may be a random person who is not related to the cargo, luggage, or passenger. The transporter may be a trustworthy person and responsible for delivering the shipping packages. The transporter may also be responsible for dropping the passengers safely and securely at estimated arrival time.

In an embodiment, the term "transporter" refers to any carriers, shippers, shipping service providers, deliverers, delivery providers, individuals, entities, or like entities, or the employees or agents of same, who or which provide for the shipment, transport, or delivery, via any one or more of ground or land transportation, rail transportation, water or sea transportation, air transportation, underwater transportation, and/or manned and/or unmanned transportation, of any of the herein-described goods, products, and/or services, which are described herein as being shipped or sent by any of the herein-described senders or sending entities.

As used herein, the term "passenger" refers to one who travels from an origin location to a destination location on a rental basis.

In an embodiment, the term "passenger" refers to a person who is traveling in an automobile, bus, train, airplane, or other conveyance, especially one who is not the driver, pilot, or the like. The passenger may be a wayfarer or a traveller.

As used herein, the term "scheduled travel event" refers to a travel event planned. The scheduled travel event may comprise information regarding origin location, one or more intermediary locations, destination location, date of travel, time of travel, duration of travel, halt location, halt duration, halt time, mode of transport, accompaniers details, luggage space, a mode of transport, etc.

In an embodiment, the term "scheduled travel event" refers to a series of action items involved in a travel plan.

As used herein, the term "shipping package" refers to a package that has to be shipped from an origin location to a destination location.

In an embodiment, the term "shipping package" refers to an enclosed or a secured container in which at least one item is packed for shipping from one place to another.

As used herein, the term "suggested shipping package" refers to one or more shipping packages suggested by the system to the transporters based on comparison of the one or more scheduled travel events of a transporter profile associated with the transporter and the one or more scheduled shipping events of the shipping packages.

In an embodiment, the term "shipping event" refers to a series of action items involved in a shipping of a package. The shipping event may be executed based on origin location, one or more intermediary locations, destination location, date of shipping, time of shipping, duration of shipping, a mode of transport, etc.

As used herein, the term "physical kiosk" refers to a device adapted to automatically load and deliver shipping packages to a transporter upon recognizing identity of the transporter. The physical kiosk may also load and deliver shipping packages prior to the transporter arrival. The physical kiosk is also capable of taking account of shipping packages that are rejected by the transporters. The physical kiosk is further capable of scanning and analyzing the shipping package and perform a security check. The physical kiosk may be like a vending machine at a transport terminal.

In an embodiment, the term "physical kiosk" is a booth present in a public place, where the users can get shipping packages or display information. The physical kiosk can be either manned type or unmanned (electronic). The physical kiosk both provides information as well as dispense suggested shipping packages.

As used herein, the term "transport terminal" refers to a boarding and departure station. The transport terminal may comprise one of a water terminal, a railway terminal, an airport, a heliport, etc.

In an embodiment, the term "transport terminal" refers to a premises used for the transfer of goods primarily involving loading and unloading of articles (e.g., shipping packages), and accordingly, involving the storing, and dispatching of the articles. Further the transport terminal refers to an area or location which serves as a pathway for handling transport process (loading and/or unloading cargo) or it can also act as a transfer point for passengers. Further the transport terminal refers to any of the place where goods are loaded or unloaded onboard a vessel/vehicle for transport.

As used herein, the term "transporter profile" refers broadly to a profile associated with a transporter. The transporter profile is a collection of settings and information associated with the transporter.

As used herein, the term "passenger profile" refers broadly to a profile associated with a passenger. The passenger profile is a collection of settings and information associated with the passenger.

As used herein, the term "disposal bin" refers to a container where the rejected shipping packages are stored for a while. The disposal bin may comprise a sensor capable of detecting and tracking the placement of the rejected shipping packages in the disposal bin.

As used herein, the term "package support system" refers to the system adapted to identify and track a shipping package among the one or more shipping packages.

As used herein, the term "package routing system" refers to the system adapted to load and rout a shipping package among the one or more shipping packages from the package storage point to a package delivery point.

As used herein, the term "package storage point" refers to a place where the package is stored or secured within the physical kiosk.

As used herein, the term "package storage point" refers to a place where the shipping packages are stored when they are not being used.

As used herein, the term "package delivery point" refers to a place or point where the package is delivered.

As used herein, the term "unwanted suggested shipping package" refers to the shipping package that are suggested by the system to the transporter but not picked up by the transporter.

As used herein, the term "package attributes" refers to features or characteristics of the shipping package. The package attributes refer to at least one of dimensions, weight, type of the item within the package, etc.

In an embodiment, the term "package attributes" refers to quality or feature of the shipping package. The attributes may be inherent part of the shipping package.

As used herein, the term "real world coordinates" refers to x- and y-coordinates of a point or node of the shipping package with respect to the coordinate system overlayed upon the Real World. By determining the real world coordinates of each and every point in the boundaries or edges, the real world coordinates for the shipping package can be determined.

As used herein, the term "image coordinates" refers to a pair of integers giving the column number and the row number for a given pixel. By determining the image coordinates of each and every point in the boundaries or edges, the image coordinates for the shipping package can be determined.

In an embodiment, the term "image coordinates" refers to the coordinates with respect to location on a digital image.

As used herein, the term "shipping label" refers to a label affixed to the shipping package that describes characteristics and shipping information of the package. The shipping label may also comprise special instructions regarding handling of the shipping package. The special instructions may comprise handle with care instructions. The shipping information may comprise origin location, destination location, etc.

As used herein, the term "prestored attributes" refers to predefined attributes of the security packages that have already passed through the security check at a transport terminal. The prestored attributes may comprise normalized values.

As used herein, the term "security check passed shipping packages" refers to the packages that have already gone through and passed the security check at the transport terminal.

As used herein "town" refers to a location where a business profile, a store, a merchant, or a shop is located. The town may be a remote town in a different country. The town also refers to a place from which shipping and delivery of products is quite complex. The town may also refer to places such as a street, a village, a city, a district, a zone, a region, a state, a country, a continent where the store is located. The town may refer to a geolocation across the globe.

In an embodiment, the term "town" refers to a location based on which information retrieval such as retrieving at least one of one or more business profiles, products, and services is performed.

As used herein "geolocation" refers to a location or address where the store owner is running a business. The geolocation may be a town as described above.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

In an embodiment, the term "geolocation" refers to a location such as a town, a street, a city, at state, etc. based on which information retrieval is performed. The information retrieval is performed by obtaining geographical location information and necessary information corresponding to a mobile terminal user, searching for preconfigured geographical location zone thresholds based on the required information, preconfigured mapping of preset geographical location zone information and category information, and retrieving target information such as at least one of business profiles, products, and services that corresponds to the necessary information based on the geographical location information of the mobile terminal user.

As used herein "shipping information" refers to the information that indicates shipping requirements concerned by the user such as a mode of transport, an origin location, a destination location, intermediary locations, a shipping package size, a shipping package volume, a shipping package weight, a material type (e.g., brittle, perishable, fragile, explosive, inflammable), pick-up date, pick-up time, pick-up location, drop date, drop time, drop location, halt time, halt duration, etc.

In an embodiment, the term "shipping information" refers to information comprising a tracking identifier generated by the shipper for the object. In another embodiment, the shipping information may identify a custody transfer, a current shipping state, weight information, and/or a shipping route associated with the object. In yet another embodiment, the shipping information includes information identifying at least one departure location and at least one destination location or a last known location of the shipping container.

As used herein "action item" refers to an action that can be performed by one or more users on the digital marketplace. The action item may be related to ecommerce that enables the users to buy, navigate menus, purchase, view rating, provide comments, recommend, payment, share, compare prices, etc. if the user is a second user. The action item may be related to ecommerce that enables the users to update inventories, update stock available at hand, update prices, update product description, update profiles, update front-end information, etc., in case, if the user is a first user.

As used herein "carrier" refers to a user who has registered to be a delivery executive to ship and deliver at least one product purchased or ordered from a digital marketplace. The carrier may also refer to the user who shares his consent to hand carry additional shipment or luggage beyond the allowed limit. The carrier further refers to the user who travels along a route identical to a route through which the product may be shipped. The carrier may have a scheduled travel plan between an origin location and a destination location at scheduled shipping date of the product. The carrier further refers to the user who travels along a route identical to a route through which another user (e.g., passenger) may travel.

In an embodiment, the term "carrier" refers to refer to individuals or entities that can provide the requested service. As an example, a user can request an on-demand service (e.g., a shared car/taxi service, telegram service, or provide a product) using the system, and a service provider can communicate with the system and/or the user to arrange to perform the service.

As used herein "shipping" refers to an action that involves responsibility of safe, reliable, quick, timely, and securely transporting a product from an origin location to a delivery location.

In an embodiment, the term "shipping" refers to receiving an on-demand request to deliver the items. A match between the package and at least one rider is determined, and a carpool proposal directed at a vehicle driver to pool the rider and the package is generated. The ride-sharing computer to deliver items packed in one or more packages is contacted; and a ride-sharing vehicle and with a mobile device coupled to the computer notifies the driver, wherein driver picks up the rider and package based on the carpool proposal.

In another embodiment, the term "shipping" refers to shipping a parcel from a shipper located at an origin location to an intended recipient located at a destination location.

As used herein "origin location" refers to a location at which a product is at least one of manufactured, packed, couriered, for sale, distributed, dispatched, and shipped.

In an embodiment, the "origin location" refers to a location where a shipping package is created for a respective shipper. The origin location may also refer to a location after which the responsibility of the shipping package is put under the responsibility of the shipper.

As used herein "destination location" refers to a location to which a product purchased or ordered from an online store should be delivered at least one of in a safe, reliable, quick, and secured manner.

In an embodiment, the "destination location" refers to a location associated with the intended recipient where the shipping package is to be delivered.

As used herein "product details" refers to information about the product. The product details may comprise product specification, product description, product size, product shape, product category (perishable, non-perishable, materialistic, etc.), product usage, product warranty, etc.

In an embodiment, "product details" refers to data describing a plurality of shipments and a plurality of three-dimensional bounding boxes used to enclose the plurality of shipments, individual ones of the plurality of shipments corresponding to at least one respective item that has been shipped in a single respective package.

As used herein "shipping requirement" refers to a requirement of the user who buys, receives, sends, delivers, and/or ships a consignment. The shipping requirement includes details of the consignment and delivery time as expected by the user. The shipping requirement may also comprise indicating shipping of the consignment from an origin location to a destination location via one or more intermediary locations and delivering the consignment at a certain date and certain time as expected by the user. The shipping requirement may refer to the information that is associated with the product ordered or purchased and yet to be delivered.

In an embodiment, the term "shipping requirement" refers to requirements of the consumer entered upon enrollment. The shipping requirement may also refer to relevant data or information that helps the system identify, conform, and dispatch the service provider to fulfill the customer's service request in accordance with their preferences. The shipping requirement may also include preference information such as evening delivery, weekend delivery, working hours delivery etc.

As used herein "ecommerce system" refers to a digital ecommerce platform that hosts one or more business profiles of one or more merchants that enables customers to buy or avail at least one of a product, and a service. The ecommerce system may be an online platform or an offline platform. The ecommerce system is further adapted to enhance business by assign shipping consignments to transporters at a transport terminal via one or more physical kiosks.

In an embodiment, the "ecommerce system" may host publications (e.g., profiles) for a plurality of publishers (e.g., business owners). The publications may include a front-end portion that includes one or more articles and an advertiser marketplace. The front-end portion may be made accessible to end-users who access the publications. The publications may also include a backend portion that can be accessed by publisher personnel. The backend portion may include tools for managing the advertiser marketplace, as well a reverse publishing system that provides an end-to-end solution for creating and publishing articles.

As used herein "seller" refers to a person who sells at least one of a product, and a service through a digital marketplace.

In an embodiment, the "seller" refers to one who offers their goods and/or services to consumers via electronic marketplaces (e.g., websites, peer-to-peer systems, etc.).

In another embodiment, the "seller" denotes a seller of products or services (also referred to as a "catalog") registered with the e-commerce business.

As used herein "buyer" refers to a person who buys or avails or wishes to buy or avail at least one of a product, and a service from a town (e.g., remote town) through a digital marketplace. The buyer may also be a visitor who just visits the digital marketplace and may become a future customer.

In an embodiment, the term "buyer" refers to one who can search a retail catalog, as well as a database of product listings from users, via a single search query.

As used herein "business type" refers to a type of a business offered by a merchant. The business type may be a leather business, a pantry business, a jewel business, etc. The business type may further to one of a service offering business, and a product sale business.

In an embodiment, the term "business type" refers to one among types of conditions that may be specified by the merchant may be dependent upon the purpose and nature of the particular marketplace system and the category or type of product being sold in the digital marketplace.

As used herein "geolocation information" refers to information that comprises address or geolocation at which the business (e.g., store, warehouse, branch, office, etc.) is located. The geolocation information comprises address of the business at one or more levels such as ranging from a continent, a country, a state, a town, a zone, a region, a street, etc.

In an embodiment, the term "geolocation information" refers to a location such as a town, a street, a city, at state, etc. based on which information retrieval is performed. The information retrieval is performed by obtaining geographical location information and necessary information corresponding to a mobile terminal user, searching for preconfigured geographical location zone thresholds based on the required information, and retrieving target information such as at least one of business profiles, products, and services that corresponds to the necessary information based on the geographical location information of the mobile terminal user.

As used herein "inventory details" refers to details comprising at least one of entire list of products, list of services, list of products available at hand, list of products sold, pricing information, product specification, product description, product review, service review, etc.

In an embodiment, the term "inventory details" refers to details that supports and assists in storing and tracking information regarding the inventory of the volume seller, such as, for example, product information, product IDs, quantities, and if applicable, product conditions.

As used herein, the term "business profile" refers broadly to a profile associated with a business of a seller. The passenger profile is a collection of settings and information associated with the business of the seller. The business profile may comprise information relevant to the business of the seller.

In an embodiment, "business profile" refers to a digital page or a digital profile that enables customers to at least one of view menus, interact with a merchant, view product specification, view service specification, view ratings, view delivery information, view offers, buy products, avail services, and perform payments.

In another embodiment, the term "business profile" refers to a profile page that allows management of a plurality of Organization related credentials such as create/modification of Basic Profile of the Organization, change of login password, enable/disable subscription to any newsletters or other literature or freebies advertised, etc. The business profile of the Organization comprises establishment of at least a unique Organization Name on the e-commerce system, login password and any other information that may be required by the system at the time of registration. The business profile also renders at least one content relevant to the business of the merchant at front end. Representative also has access to the profiles of the Organizations in his portfolio.

As used herein "business" refers to sale of a product or a service to a customer at least for monetary benefits. The business may refer to an action of buying a product or availing a service to fulfil needs or to redistribute product/service for monetary benefits.

In an embodiment, the term "business" refers to a sale of products or services via electronic communication mediums, such as the ubiquitous Internet. Such business may take the form of online virtual stores, etc.

As used herein "preference information" refers to information that indicates or shows consent or willingness of a user to be a partner, a vendor, a carrier, a driver, a service provider, etc.

In an embodiment, the "preference information" refers to information that indicates his/her personality type/preference for a preferred level of interaction ensures that riders and drivers alike are more likely to have a positive experience on a given ride.

As used herein "business information" refers to information related to business and/or organization that comprises information regarding employees, revenue, human resource, payroll, finance, inventory, supply chain, customer relationship management (CRM), contact list management, etc.

In an embodiment, the "business information" refers to information used by the organization at backend to perform a specific business function (e.g., inventory, finance, accounting, sales force automation, and human resources).

As used herein "service information page" refers to a dynamic web page of a business of a merchant that coordinates and manages business information, product catalog, inventory details, pricing information, a business catalog, preference information, business offers at backend and available product/service listings at front end that enables users to view, purchase and avail at least one of a product, and a service. The service information page further enables the customer to perform at least one action item such as navigating, viewing, buying, recommending, products, or services with minimal interaction. The service information page further shares the traffic of the customers of the actual web page. In an embodiment, the service information page is like a mini-web page which acts like a secondary lite web page.

In an embodiment, "the service information page" comprises a product image and description, and may include customer ratings, customer and professional reviews, sales rank data, lists of related products, and/or other types of supplemental data that may assist consumers in making informed purchase decisions. This supplemental data may be maintained or generated by the operator of the marketplace system as a service to its customers. Users of the system can preferably locate specific product detail pages within the catalog by executing search queries, navigating a browse tree, or using any other navigation method supported by the particular system.

In another embodiment, the "service information page" refers to integration of an organization's "front-office" with its "back-office" that allows front-office functions that interact with the customer to collaborate with backend functions.

As used herein "search field" refers to an input field in a user interface rendered to a user to search and retrieve one of (a) at least one of a product, and a service from a business profile, and (b) a business profile, based on at least one factor. The at least one factor may be a town, a city, a street, a district, a zip-code, a country, a continent, a zone, a region, etc. The at least one factor may also be at least one of a name, a business type, a brand, a price, and an offer.

In an embodiment, the term "search field" refers to a field acquiring need information and geographic location information corresponding to a mobile terminal user, looking up a preset geographic location zone threshold value based on the need information, preconfigured mappings of preset geographical location zone information and category information, and searching for target information corresponding to the need information based on the geographic location information of the mobile terminal user and the preset geographic location zone threshold value.

As used herein "business management function" refers to an act of coordinating and managing a business function that happens at backend such as inventory, finance, Human Resource (HR), customer relationship management (CRM), contact list management, supply-chain management, etc.

In an embodiment, the "business management function" refers to a back-office function such as an enterprise resource planning function (e.g., inventory, finance, accounting, sales force automation, and human resources).

As used herein "consignment" refers to a package, item, or product that are to be shipped, transported, and delivered reliably, safely, and securely. The consignment may refer to products or items that are already packed safe and are ready to be dispatched. The consignment may also refer to a passenger who avails pooled transport.

In an embodiment, the "consignment" refers to an arrangement in which goods are left in the possession of an authorized third party to sell, dispatch, ship, transport, in custody, deliver.

As used herein "itinerary information" refers to a travel plan of a user. The itinerary information comprises scheduled events, their locations, duration, time, date, etc.

In an embodiment, "itinerary information" refers to a trip to work, trips to a doctor, trips to a grocery store, and the like. The itineraries may also include other infrequently used itineraries, such as vacation trips, extended travel, short term trips, quick trips, and the like. The itineraries are further divided into a departure point, a start time, a destination, and an end time or predicted departure time. The itinerary information may also include intermediate waypoints that further define the route. The itinerary information may include, without limitation, departure point, departure time, destination, intended route, and optionally intermediate waypoints.

As used herein "pick-up time" refers to a time at which pick-up is scheduled for at least one of goods, or a passenger.

In an embodiment, the "pick-up time" refers to a parameter or criterion to be agreed by the rider and the driver in setting up a pooled transport/rideshare.

As used herein "pick-up date" refers to a date at which pick-up is scheduled for at least one of goods, or a passenger.

In an embodiment, the "pick-up date" refers to a parameter or criterion to be agreed by the rider and the driver in setting up a pooled transport/rideshare.

As used herein "pick-up location" refers to a location from which pick-up is scheduled for at least one of goods, or a passenger.

In an embodiment, the "pickup location" refers to a parameter or criterion to be agreed by the rider and the driver in setting up a pooled transport/rideshare.

As used herein "drop time" refers to a time at which dropping is scheduled for at least one of goods, or a passenger.

In an embodiment, the "drop time" refers to a parameter or criterion to be agreed by the rider and the driver in setting up a pooled transport/rideshare.

As used herein "drop date" refers to a date at which dropping is scheduled for at least one of goods, or a passenger.

In an embodiment, the "drop date" refers to a parameter or criterion to be agreed by the rider and the driver in setting up a pooled transport/rideshare.

As used herein "drop location" refers to a location to which drop is scheduled for at least one of goods, or a passenger.

In an embodiment, the "drop location" refers to a parameter or criterion to be agreed by the rider and the driver in setting up a pooled transport/rideshare.

As used herein "halt time" refers to a time at which halt/rest is scheduled for at least one of goods, or a passenger.

In an embodiment, the "halt time" refers to a parameter or criterion to be agreed by the rider and the driver in setting up a pooled transport/rideshare.

As used herein "halt duration" refers to a duration for which halt/rest is scheduled for at least one of goods, or a passenger.

In an embodiment, the "halt duration" refers to a parameter or criterion to be agreed by the rider and the driver in setting up a pooled transport/rideshare.

As used herein "halt location" refers to a location at which halt/rest is scheduled for at least one of goods, or a passenger.

In an embodiment, the "halt location" refers to a parameter or criterion to be agreed by the rider and the driver in setting up a pooled transport/rideshare.

As used herein "shipment volume" refers to amount of space that the products, or package occupies.

In an embodiment, the "shipment volume" refers to information that describes the shipment.

As used herein "shipment weight" refers to relative mass or quantity of matter contained by the product.

In an embodiment, the "shipment weight" refers to information that describes the shipment.

As used herein "shipment" refers to any item, product, or goods that should be carried or shipped from one place to another place. The term shipment may also refer to action of shipping goods.

In an embodiment, the "shipment" comprises one or more activities related to the transport of an item from one location to another. Such activities may include obtaining and/or providing information about a shipment (e.g., a destination shipping address, a parcel weight and/or size, a tracking number, etc.), outputting a shipping label for the shipment (e.g., an address label, postage indicia, etc.), delivery and/or receipt of the shipment, etc. Items may include any objects that may be transported by a shipping carrier network (e.g., the U.S. Postal Service, Federal Express, a shipping agency, etc.), such as goods (e.g., items purchased by customers), packages, communications (e.g., letters, documents, magazines, flyers, etc.), etc. Preparing an item shipment includes any item shipment tasks or activities that are performed prior to the dispatch of the shipment, for example prior to tendering the shipment to a carrier. For example, preparing an item shipment may include preparing a packing list, preparing a pick list, producing a shipping label, selecting shipment items, packaging items, affixing one or more labels to a package, and the like.

As used herein "carriable" refers to an amount or quantity of shipment (e.g., products, consignment) that the user can carry or ship. The term carriable may also refer to an amount or quantity of shipment (e.g., products, consignment) that the user is willing to carry or ship.

In an embodiment, the term "carriable" refers to the information, provided by the carrier related to the shipment, comprising at least one of weight, destination location, origination location, mail class, and delivery date.

FIG. 1 illustrates a block diagram of an ecommerce system, according to some embodiments. The ecommerce system comprises a transporter profile database 1002, a shipping package database 1004, a control circuit 1006, computing devices 1014, and one or more physical kiosks 1016. The computing devices 1014 may be associated with the users of the system. The computing devices 1014 may be a personal digital assistant such as a mobile, a laptop, a computer, a tablet, a smartphone, etc. The users comprise sellers, buyers, transporters, passengers, etc. The transporter profile database 1002 maintains a transporter profile for each of multiple different transporters registered with the system. The transporters log in scheduled travel events with the system. The system records the scheduled travel events under respective transporter's profile. The shipping package database 1004 maintains a shipping profile for each of multiple different shipping packages. Senders who wish to transport shipping packages from one place to other place registers with the system. The senders may be sellers, store owners, or random persons who wish to ship items from one place to another place. The senders then log in the shipping events with the system. The system records the shipping events under respective shipping package's profile. The control circuit 1006 is communicatively coupled to the user computing devices, the transporter profile database 1002, the shipping package database 1004, and the one or more physical kiosks 1016 through a network 1026. The network 1026 may be a wired network or a wireless network.

The control circuit 1006 is configured to receive inputs from the user computing devices and coordinate with the system to perform the intended tasks. The control circuit 1006 is further configured to access the transporter profile database 1002, and the shipping package database 1004. The control circuit 1006 is configured to compare and match the information associated with each transporter profile in the transporter profile database and the information associated with each shipping package profile in the shipping package database. The control circuit 1006 is configured to perform the matchings either in part and/or entirely. The control circuit 1006 then assigns the suggested consignment (i.e., shipping packages) to the transporters. The control circuit 1006 instructs the one or more physical kiosks 1014 to deliver the suggested shipping packages to the transporter prior to arrival of the transporter at a transport terminal. The transport terminal may be a water transport terminal, a railway terminal, a road transport terminal, and an aviation terminal.

The system further comprises a global positioning system (GPS) 1012. The global positioning system (GPS) 1012 is configured to identify and trace location of the transporters. The GPS 1012 then determines estimated arrival time of the transporters at the transport terminal. The GPS 1012 then communicates the location of the transporters and the estimated arrival time of the transporters to the control circuit. The control circuit 1006 instructs the one or more physical kiosks 1016 to deliver the suggested shipping packages to the transporter prior to the transporter's arrival.

The physical kiosk 1016 is adapted to identify and track the location of the shipping packages. The physical kiosk 1016 is also adapted to route the shipping package from a shipping package storage point 1018 and deliver the shipping package at a shipping package delivery point 1020. The physical kiosk 1016 further comprises a disposal bin 1022. The disposal bin 1022 is adapted to hold and secure unwanted suggested shipping packages that are rejected by the transporters. The disposal bin may comprise a bin sensor 1024 that is adapted to track the placement of unwanted suggested shipping packages in the disposal bin 1022. The physical kiosk may comprise an automated loading system. The automated loading system may load the shipping packages from the disposal bin 1022 and place it in the shipping package storage point 1018 for reassigning those shipping package to subsequent transporters.

The system may comprise a passenger profile database 1008. The passenger profile database 1008 maintains a passenger profile for each of multiple different passengers. Passengers, who wish to avail transport on a rental basis from one place to other place, registers with the system. The passengers then log in the travel events/plans with the system. The system records the travel events under respective passenger's profile. The control circuit 1006 may be communicatively coupled to the passenger profile database 1008, and the transporter profile database 1002. The control circuit 1006 then compares and matches the information associated with each transporter profile in the transporter profile database 1002 and the information associated with each passenger profile in the passenger profile database 1008. The control circuit 1006 performs the matching either in part and/or entirely.

The system may also comprise a business profile database 1010. The business profile database 1010 maintains a business profile for each of multiple different business associated with the one or more sellers. Sellers register with the system and log in the information, related to the business, with the system. The system records the information under respective business profile. The control circuit 1006 may be communicatively coupled to the business profile database 1010. The control circuit 1006 receives search information query from a customer (i.e., buyer). The search information query comprises a query regarding a business profile or a product or a service. The search information query may also be based on geolocation. The system enables the buyer to search for products, business, stores, or services based on location (e.g., a remote town) using the search information query. The search information query may comprise a keyword, geolocation name, product name, service name, store name, business name, etc.

The control circuit 1006 is configured to access the business profile database. The control circuit 1006 creates a service information page for the business profile of the one or more business profiles when the control circuit 1006 receives the search information query for the business profile. The service information page of the business profile is generated instantly and rendered by the control circuit 1006 when the business profile is accessed. The control circuit 1006 is also capable of keep tracking and recording one or more business management functions and one or more ecommerce action items executed on the service information page. The control circuit 1006 is also configured to update the service information page based on execution of the one or more business management functions and the one or more ecommerce action items.

Figure 2:
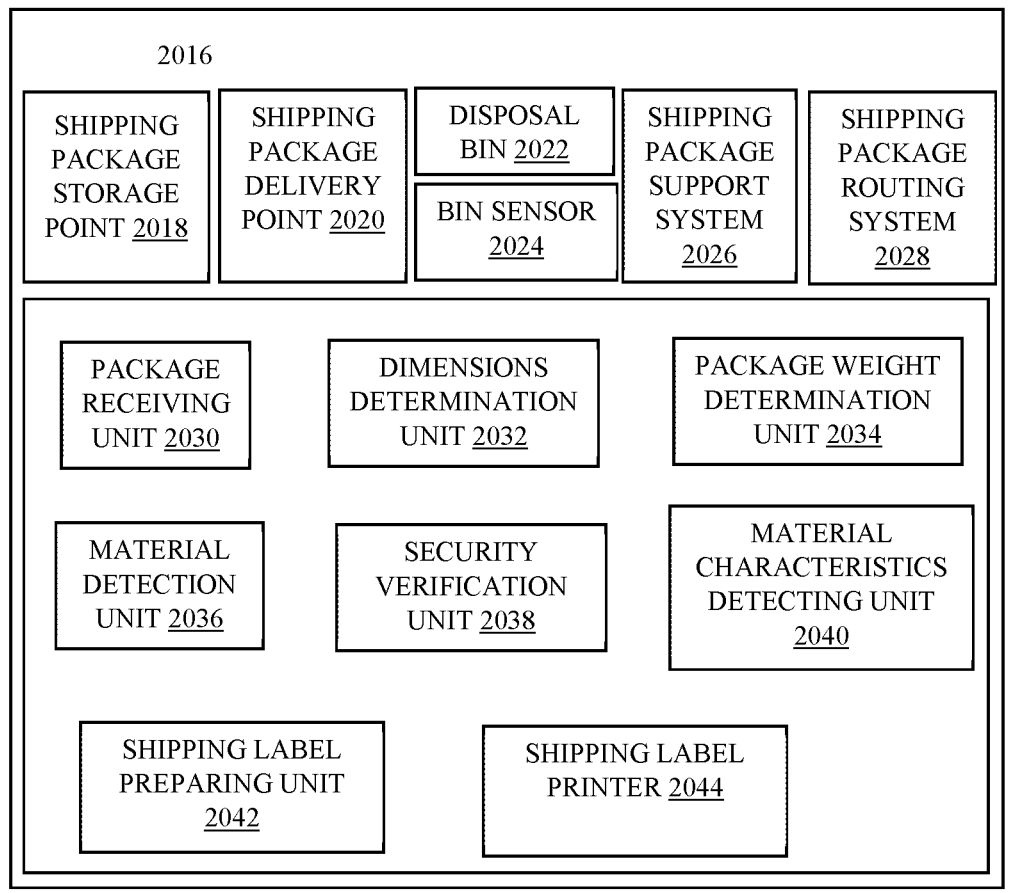
FIG. 2 illustrates an exploded view of a physical kiosk, according to some embodiments.

FIG. 2 illustrates an exploded view of a physical kiosk 2016, according to some embodiments. The physical kiosk 2016 comprises a shipping package storage point 2018, a shipping package delivery point 2020, a disposal bin 2022, and a bin sensor 2024. The shipping package storage point 2018 is adapted to hold and secure shipping packages that are to be dispatched to transporters. Senders who wish to ship or transport the shipping packages may register with a system and deliver the shipping packages to the physical kiosk 2016. The physical kiosk 2016 receives the shipping packages via a conveyor belt. In an embodiment. the physical kiosk 2016 receives the shipping packages via the conveyor belt at a scheduled time. The physical kiosk 2016 may recognize an identity of the shipping packages while receiving the shipping packages from the senders. The physical kiosk 2016 recognizes the identity of the shipping packages based on the time received. The physical kiosk 2016 may recognize the identity of the shipping packages based on at least one of a bar code, and a radio frequency id associated with the shipping packages.

The physical kiosk 2016 may comprise a shipping package support system 2026, and a shipping package routing system 2028. The physical kiosk 2016, upon recognizing the identity of the shipping package, assigns a location for holding and securing the shipping packages within the shipping package storage point 2018. The shipping package support system 2026, and the shipping package routing system 2028 is adapted to load and route the shipping packages to the assigned location within the shipping package storage point 2018. The shipping package support system 2026, and the shipping package routing system 2028 is also adapted to load and deliver the shipping packages from the shipping package storage point 2018 to the shipping package delivery point 2020. The physical kiosk 2016 is also communicatively coupled to a global positioning system (GPS) 1012.

The global positioning system 1012 determines and tracks a location of the transporters. The GPS 1012 further estimates an estimated arrival time of the transporters at a transport terminal. The GPS communicates the estimated arrival time of the transporters to a control circuit 1006. The control circuit 1006 suggests the shipping packages to the transporters based, in part, comparisons between transporter profiles and the shipping package profiles. The control circuit 1006 instructs the physical kiosk 2016 to dispatch and deliver the suggested shipping packages to the transporters prior to the arrival of the transporters. The transporters may reject the suggested shipping packages delivered at the shipping package delivery point 2020.

The disposal bin 2022 collects the shipping packages that are rejected by the transporters. The disposal bin 2022 further comprises the bin sensor 2024 associated with the disposal bin 2022. The bin sensor 2024 detects placement of the rejected suggested shipping packages. The bin sensor 2024 determines the count of the rejected suggested shipping packages. The bin sensor 2024 further recognizes identity of the rejected suggested shipping packages. The bin sensor 2024 further communicates the identity of the rejected suggested shipping packages to the control circuit 1006. In an embodiment, the physical kiosk 2016 may comprise an automated loading system. The automated loading system may load the shipping packages from the disposal bin 2022 and place it in the shipping package storage point 2018 for reassigning those shipping package to subsequent transporters. The control circuit 1006 keeps track of the shipping packages that are left at the shipping package storage point 2018. The physical kiosk 2016, upon receipt of the instructions from the control circuit 1006, dispatches the rejected suggested shipping packages to the subsequent transporters.

In an embodiment, the physical kiosk 2016 comprises a package receiving unit 2030, a dimension determination unit 2032, a package weight determination unit 2034, a material detection unit 2036, and a security verification unit 2038. The package receiving unit 2030 receives the shipping package via a conveyor belt. The package receiving unit 2030 forwards the shipping package to the dimension determination unit 2032. The dimensions determination unit 2032 captures an image of the shipping package and determines the dimensions of the shipping package. The dimensions determination unit 2032 identifies boundaries and/or edges of the shipping package from the image of the shipping package. The dimensions determination unit 2032 then calculates image coordinates from the boundaries and/or the edges determined. The dimensions determination unit 2032 then estimates real world coordinates using the image coordinates. The dimensions are then determined from the real world coordinates by the dimension determination unit 2032. The dimensions comprise at least one of length, width, and height of the shipping package.

The package weight determination unit 2034 comprises at least one of a weighing scale, a weight sensor, and a load cell. The package weight determination unit 2034 determines the weight of the shipping package and communicates to the control circuit. The material detection unit 2036 scans the shipping package and determines whether at least one of an explosive material, an inflammable material, a flammable material, a combustible material, is associated or contained within the shipping package. The security verification unit 2038 analyses the shipping package and provides a recommendation whether the shipping package passes through a security check at the transport terminal. The security verification unit 2038 comprises at least one of a chemical detector, a millimeter wave scanner, an x-ray detector, and an automatic target recognition unit. The physical kiosk 2016 communicates attributes (e.g., weight, dimensions, item type, material characteristics, etc.) of the shipping package to the control circuit. The control circuit 2006 also receives shipping information of the shipping package from a sender. The control circuit 2006 then records the attributes of the shipping package and the shipping information of the shipping package in the shipping package database.

The physical kiosk 2106 further comprises a material characteristic detecting unit 2040. The material characteristic detecting unit 2040 detects whether an item in the shipping package is at least one of fragile, non-fragile, transparent, brittle, ductile, liquid, hard, transparent, granular, spillable, and tensile. The material characteristics detecting unit 2040 is adapted to transmit a signal into the shipping package. The material characteristics detecting unit 2040 analyses a return signal from the shipping package. The material characteristics detecting unit 2040 then determines the loss and characteristics of the return signal. The material characteristics detecting unit 2040 then determines a type of the item in the shipping package based on analyzing the return signal and comparing with the signal transmitted. The material characteristics detecting unit 2040 communicates the detected type of the item to the control circuit 2006. The control circuit 2006 records the type of the item under respective shipping package in the shipping package profile database.

The security verification unit 2038 receives attributes of the shipping package from the shipping package profile database. The security verification unit 2038 then compares the attributes with prestored attributes. The prestored attributes comprises attributes of one or more security check passed shipping packages. The security check passed shipping packages refers to the shipping packages that already gone through and passed the security check at the transport terminal. The security verification unit 2038 provides recommendation whether the shipping package passes through the security check at the transport terminal. The security verification unit 2038 provides the recommendation based on the comparison of the attributes of the shipping package and the prestored attributes of the security check passed shipping packages. The security verification unit 2038 also provides the recommendation based The physical kiosk 2016 further comprises a shipping label preparing unit 2042. The shipping label preparing unit 2042 is adapted to receive the shipping information of the shipping package, and at least one of the dimensions, the weight, and a type of an item in the shipping package. The shipping label preparing unit 2042 further extracts at least an origin location, a destination location, an intermediary location, a shipping date, and a shipping time from the shipping information. The shipping label preparing unit 2042 then prepares a shipping label comprising information of at least the origin location, the destination location, the intermediary location, the shipping date, the shipping time, and the type of the item. The shipping label preparing unit 2042 is also configured to prepare the shipping label comprising handle with care instructions. The handle with care instructions is composed using artificial intelligence techniques, based on information of the type of the item within the shipping package. The physical kiosk 2016 further comprises a shipping label printer 2044 adapted to print a shipping label on the shipping package.

Figure 3:
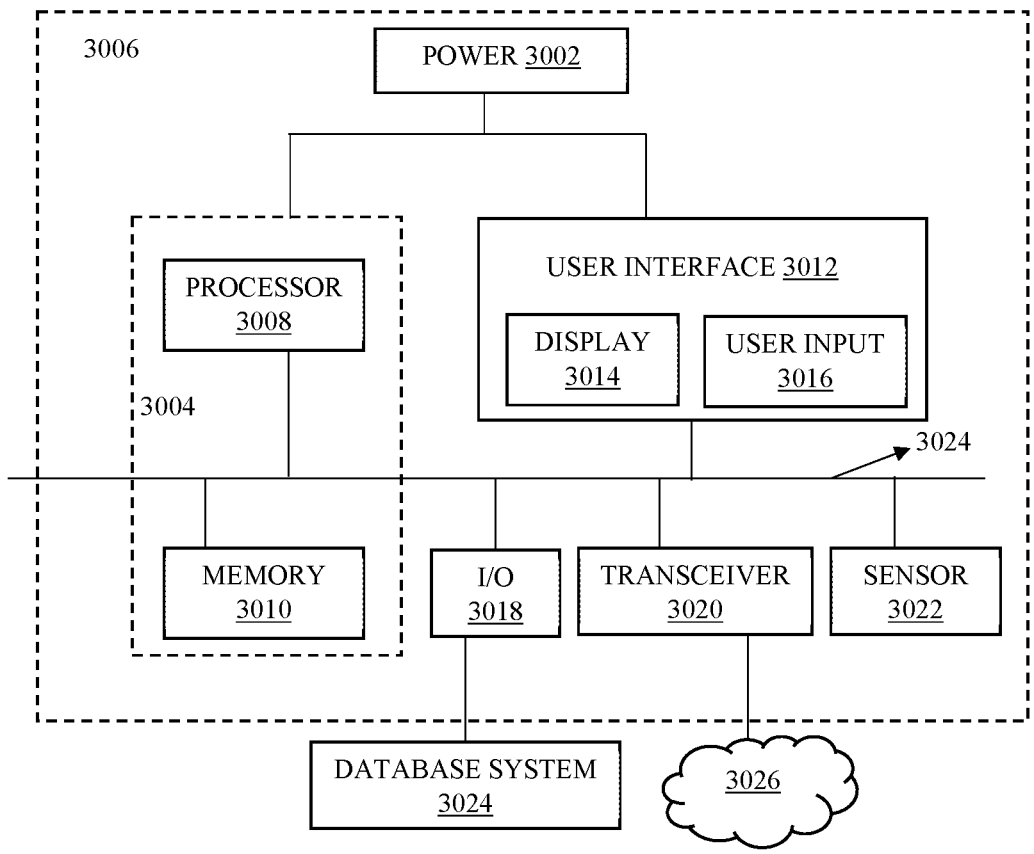
FIG. 3 illustrates an exploded view of a control circuit, according to some embodiments.

FIG. 3 illustrates an exploded view of a control circuit 3006, according to some embodiments. The control circuit 3006 comprises a power supply or power source 3002. The control circuit 3006 is implemented through one or more processors, microprocessors, central processing unit, logic, local digital storage, firmware, software, and/or other control hardware and/or software. The control circuit 3006 may be used to execute or assist in executing the steps of the processes, methods, functionality, and techniques described herein. The control circuit 3006 controls various communications, decisions, programs, content, listings, services, interfaces, logging, reporting, etc. The control circuit 3006 described herein comprises a control system 3004. The control system 3004 comprises a processor 3008, and a memory 3010. The memory 3010 comprises instructions that are to be executed by the processor 3008.

The control circuit 3006 further comprises a user interface 3012 that is configured to interact with a user. The user interface 3012 comprises a display 3014, and acquires user inputs 3016 through user input devices. The user interface 3012 rendered to the user may be through one of a web portal or a mobile application configured. The user input devices comprise at least one of buttons, touch screen, track ball, keyboard, mouse, etc., The user input devices can be part of or wired or wirelessly coupled with the system. The system described herein also comprises one or more communication interfaces, I/O ports 3018, transceivers 3020, and the like. The one or more communication interfaces, I/O ports 3018, and transceivers 3020, allow the system to communicate over a communication bus, a distributed computer and/or communication network (e.g., a local area network (LAN), the Internet, wide area network (WAN), etc.), communication link 3024, other networks or communication channels with other devices and/or other such communications or combination of two or more of such communication methods. The transceiver 3020 can be configured for wired, wireless, optical, fiber optical cable, satellite, or other such communication configurations or combinations of two or more of such communications.

The one or more input/output (I/O) ports 3018 allow one or more devices to couple with the control circuit 3006. The I/O ports 3018 can be substantially any relevant port or combinations of ports, such as but not limited to USB, Ethernet, or other such ports. The I/O port/interface 3018 can be configured to allow wired and/or wireless communication coupling to external components. For example, the I/O port/interface 3018 can provide wired communication and/or wireless communication (e.g., Wi-Fi, Bluetooth, cellular, RF, and/or other such wireless communication). In some instances, the I/O port/interface 3018 may comprise any known wired and/or wireless interfacing device, circuit and/or connecting device, such as but not limited to one or more transmitters, receivers, transceivers, or combination of two or more of such devices.

The sensors 3022 are adapted to provide information to the system and/or sensor information that is communicated to another component, such as the central control system, product routing system, etc. The sensors 3022 can include substantially any relevant sensor, such as radio frequency identification (RFID) tag reader sensors, cameras and image processing systems, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The control circuit comprises an example of a control and/or processor-based system with the control system. Again, the control system can be implemented through one or more processors, controllers, central processing units, logic, software, and the like. Further, in some implementations the control system may provide multiprocessor functionality.

The memory 3010, which can be accessed by the control system, typically includes one or more processor readable and/or computer readable media accessed by at least the control system. The memory 3010 can include volatile and/or non-volatile media, such as RAM, ROM, EEPROM, flash memory and/or other memory technology. Further, the memory 3010 is shown as internal to the control system. The memory 3010 can also be internal, external or a combination of internal and external memory. Similarly, some or all of the memory 3010 can be internal, external or a combination of internal and external memory of the control system. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all the memory may be distributed at multiple locations over the computer network. The memory 3010 can store code, software, executables, scripts, data, content, lists, programming, programs, log or history data, user information, customer information, product information, and the like. While FIG. 3 illustrates the various components being coupled together via a bus, it is understood that the various components may be coupled to the control system and/or one or more other components directly.

Further, the control circuit 3006 is communicatively coupled with a database system 3024. The database system comprises one or more databases. The one or more databases comprise at least one of a transporter profile database, a shipping package database, a passenger profile database, and a business profile database. The control circuit 3006 is configured to communicate with the database system and access information recorded within the one or more databases. The control circuit 3006 is further configured to analyze the information and trigger instructions to a physical kiosk. The control circuit 3006 is also configured to update the information in the database system based on execution of one or more action items. In an embodiment, the control circuit 3006 may be a server. The server may be a physical server or a cloud server. The control circuit 3006 is communicatively coupled with other components of the system through a network 3026. The network 3026 may be a wireless network or a wired network.

Figure 4:
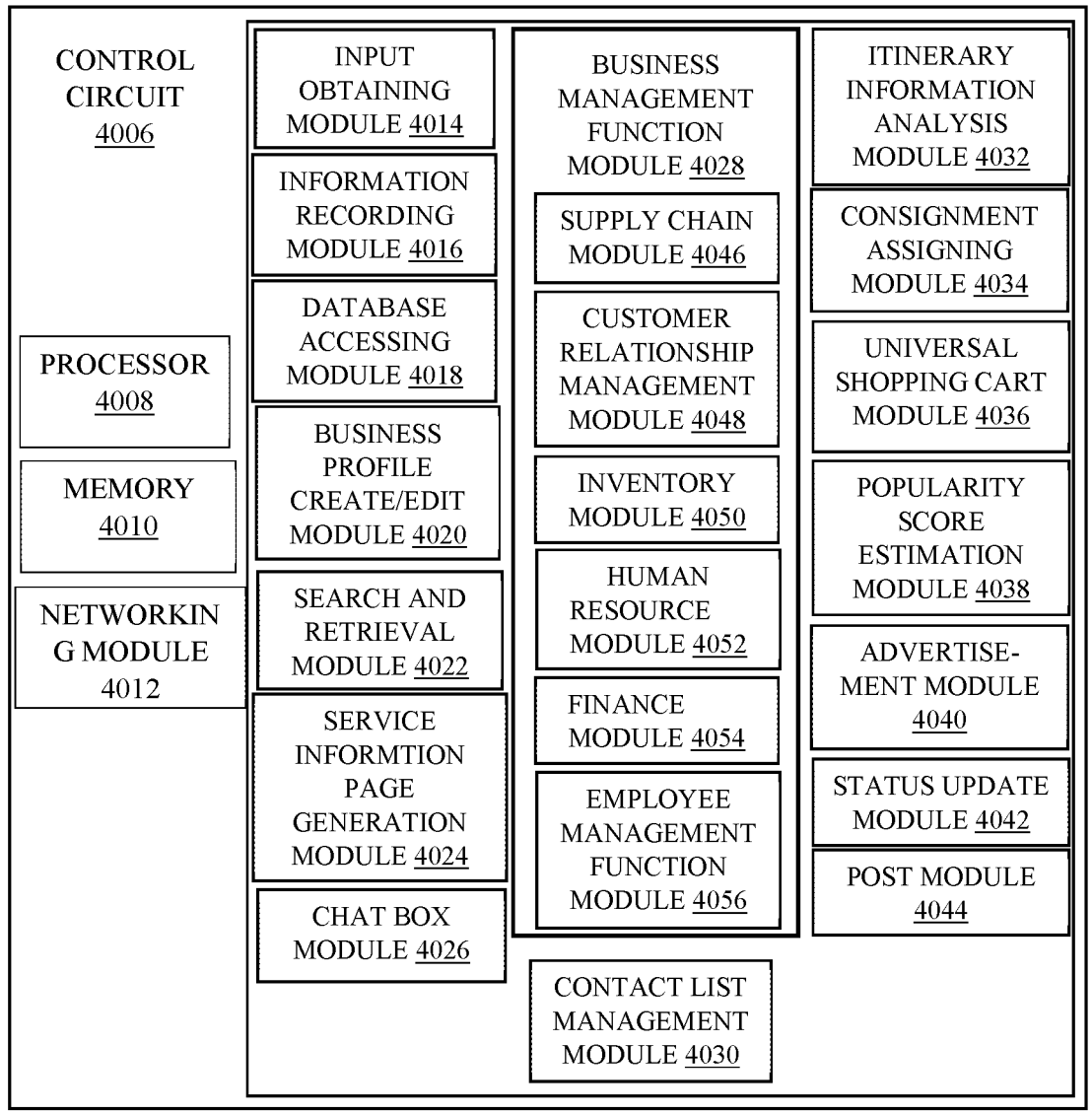
FIG. 4 illustrates a block diagram of a control circuit, according to some embodiments.

FIG. 4 illustrates a block diagram of a control circuit 4006, according to some embodiments. The control circuit 4006 enables the seller (e.g., store owners of small business) to create an online storefront and involve in e-business without even having an actual web page. The control circuit 4006 enables remote store owners to create the business profile of their business and associate with a particular location (e.g., town) and get global exposure. The control circuit 4006 enables the seller to display/advertise their products and/or services via the business profile that they would intend to sell online to their customers. The control circuit 4006 also enables a prospective customer (i.e., the buyer) to virtually visit the business profile of a store located in any town and buy products or services that are offered by the business.

In an embodiment, the control circuit 4006 deploys the ecommerce webpage as Software as a service (SaaS). Software as a service (SaaS) is a software distribution model in which a cloud provider hosts applications and makes them available to end users over the internet. In another embodiment, the control circuit 4006 can also deploy the ecommerce webpage as a platform as a service (PaaS). PaaS (platform as a service) is a cloud computing model where a third-party service provider delivers hardware and software tools (like a dongle) to users over the internet. The control circuit 4006 also deploys the ecommerce webpage as at least one of a business to consumer (B2C) model, and a business-to-business (B2B) model. In case of the business-to-business model, the ecommerce webpage enables business between a primary business owner and a secondary business owner (e.g., business between wholesaler and retailer). In the case of the business to consumer model, the control circuit 4006 enables business between a business owner and a consumer (e.g., business between store owner and a customer). In an embodiment, the ecommerce webpage rendered by the control circuit 4006 is a geolocation based and/or geolocation driven marketplace in which each and every action is performed based on a geolocation. In another embodiment, the control circuit 4006 enables the one or more users to execute an action of ecommerce upon accessing and going to a particular geolocation.

The control circuit 4006 comprises a processor 4008 and a memory 4010. The processor 4008 is configured to execute one or more instructions as stored within the control circuit 4006. The control circuit further comprises a networking module 4012. The networking module 4012 is configured to transmit and receive information with other components or devices that are communicatively coupled to the control circuit 4006. The control circuit 4006 further comprises one or more modules of instructions that are to be executed by the processor 4008.

The one or more modules comprises an input obtaining module 4014, an information recording module 4016, a database accessing module 4018, a business profile create/ edit module 4020, a search and retrieval module 4022, a service information page generation module 4024, a chat box module 4026, a business management function module 4028, a contact list management module 4030, an itinerary information analysis module 4032, a consignment assigning module 4034, a universal shopping cart module 4036, a popularity score estimation module 4038, an advertisement module 4040, a status update module 4042, and a post module 4044.

The input obtaining module 4014 obtains at least one input from at least one of a seller, a buyer, a transporter, a passenger, etc. In an embodiment, the at least one input obtained from the seller comprises information related to a business of the seller (e.g., small merchant in a remote town, store owner, a representative of a large business, etc.). The information related to the business comprises at least one of a name, a business type, a geolocation information, a logo, a business catalog, pricing information, preference information, business offers, web page information, and business information. The information related to the business is received by the control circuit 4006 The information related to the business is utilized to register and sign-up. In another embodiment, the at least one input, obtained from at least one of the seller, the buyer, the transporter, the passenger, comprises itinerary information, preference information, consent information, shipping requirement etc. In yet another embodiment, the at least one input obtained from the buyer comprises an input on at least one search field. The at least one input from the buyer may be a search query based on a geolocation. In yet another embodiment, the at least one input obtained from the transporter comprises scheduled travel events. The scheduled travel event comprises an origin location, destination location, mode of transport, halt time, halt duration, halt date, pick up time, pick up date, drop time, drop date, accompaniers information, etc. In yet another embodiment, the at least one input obtained from the passenger comprises travel plan. The travel plan also comprises an origin location, destination location, mode of transport, halt time, halt duration, halt date, pick up time, pick up date, drop time, drop date, accompaniers information, etc.

The information recording module 4016 records the at least one input obtained from at least one of the seller, the buyer, the transporter, and the passenger into respective databases. The databases comprise a transporter profile database, a shipping package database, a passenger profile database, a business profile database, etc. The transporter profile database holds and maintains data related to transporters such as scheduled travel events. The shipping package database holds and maintains data related to shipping events. The passenger profile database holds and maintains data related to passengers such as travel plans. The business profile data holds and maintains information related to business of the sellers. The information recording module 4016 also extracts the at least one input from respective computing devices associated with respective users. In an embodiment, the information recoding module 4016 utilizes at least one of natural language processing, or artificial intelligence or machine learning to extract the at least one input. The information recording module 4016 also records events or action items (e.g., timestamp, details of users who edited the data, modified data, old data, etc.) related to data storage or data modification.

The database accessing module 4018 is configured to access the databases (e.g., the transporter profile database, shipping package database, passenger profile database, business profile database, etc.) and analyze the data recorded within the databases. The database accessing module 4018 analyzes the data using at least one of artificial intelligence, machine learning, or natural language processing. The database accessing module 4018 analyzes the data and provides suggestions or recommendations to the users. For Example, the database accessing module accesses the database of transporter profiles and the database of shipping package profiles and identifies one or more suggested shipping packages for a transporter based on comparisons between the database of transporters and the database of shipping package profiles.

The business profile create/edit module 4016 accesses the database of business profiles and generates one or more business profiles based on the data recorded within the database of business profiles when the buyer access the business profile. The business profile create/edit module 4016 generates the one or more business profiles conveniently based on the data recorded. The business profile create/edit module 4016 generates the one or more business profiles through the ecommerce system conveniently without even having coding knowledge. The business profile create/edit module 4016 enables the seller to create the business profile conveniently and cheaply with basic information such as business name, a business type, a geolocation information, a logo, a business catalog, pricing information, preference information, business offers, web page information, business information, etc. The business information may comprise organizational information.

The business profile create/edit module 4016 generates one or more business profiles and links to the geolocation information (e.g., town, city, street, etc.). When the buyer access that geolocation (e.g., town), the one or more business profiles, the products and or services linked to that town gets retrieved. In an embodiment, the one or more business profiles are linked or associated with other geolocation (such as a street, a village, a zone, a region, a city, a district, a state, a country) and therefore whenever the buyer access that geolocation, the one or more business profiles linked to that geolocation gets retrieved and rendered by the control circuit.

The one or more business profiles comprises at least one content that is related to the business of the seller. The at least one content comprises at least one of an advertisement, an audio, a video, a snippet, a notification, an offer, a description, and a promotion that attracts the buyer (e.g., customer, a visitor, etc.) to access the one or more business profiles. The one or more business profiles may comprise a link that may drag the buyer to another web page for at least one of price comparison, product specification, third party review, a testimonial page, etc. The one or more business profiles comprises information that are to be rendered at front-end such as product listings, service listings, pricing information, product catalogs, reviews, and an action field (e.g., search, buy, order, etc.). In an embodiment, the business profile create/edit module 4016 enables the buyer to at least one of edit, modify and delete the one or more business profiles recorded within the database of business profiles. The business profile create/edit module 4016 enables the seller to alter the information rendered by the one or more business profiles to the buyer. In an embodiment, the business profile create/edit module 4016 enables the seller to edit, delete or modify the look, the descriptive information, the product details, etc. on the business profile.

The search and retrieval module 4018 searches and retrieves at least one of the one or more business profiles, the one or more products, and the one or more services based on the at least one input (e.g., search information query) obtained from the buyer in the at least one search field. The at least one search field comprise at least one of a town-based search field, a street-based search field, a district-based search field, a city-based search field, a state-based search field, a region-based search field, a country-based search field, a continent-based search field, a name-based search field, a zip-code based search field, a business type-based search field, a brand-based search field, a price-based search field, an offer-based search field, a product-based search field and the like. The zip-code based search field enables users to input at least one zip-code and search and retrieve at least one business profile linked with that geolocation. The zip-code based search field may be provided within at least one country of interest.

The service information page generation module 4024 generates a service information page for the business based on the information recorded into a business profile database when the buyer accesses the business profile of the one or more business profiles. The service information page is a dynamic consolidated web page that is capable of managing business management functions at backend. In an embodiment, the service information page comprises a cloud web page that performs, computes and records information pertinent to ecommerce in a cloud. The service information page further renders one or more products, one or more services, and one or more action items associated with at least one of the one or more products and the one or more services at the front-end. The one or more action items comprise a search action, a purchase action, a payment action, a view action, etc. The service information page is capable of getting updated dynamically based on execution of the one or more business management functions and the one or more action items performed. The service information page pops up like an instant window that enables the buyer to perform at least one action item such as navigating, buying, viewing menus, payment, etc. The service information page further shares the traffic of the customers (e.g., buyers) of the actual web page in case when the seller has the actual web page.

The service information page generation module 4024 eliminates a need for the seller (e.g., a small merchant) to have an actual web page by connecting the service information page through the ecommerce system. The seller may feel tedious and complex in constructing the actual web page. The actual web page further involves frequent monitoring and updates. The service information page generation module 4024 further eliminates a need to know or be aware of web address of the business. The service information page generation module 4020 is also capable of extracting information related to the business from the actual web page and generating the service information page from the extracted information when the first user has the actual web page already.

The service information page may or may not be connected to the actual web page. The service information page may further communicate the action items such as navigations, purchases, product views, recommendations, etc. that are performed by the users on the service information page to the actual web page. In an embodiment, the service information page itself monitors and keeps track of the inventories, purchases, products available at hand, products on demand, shipping, organization information, CRM, contact list, etc. by itself without communicating to the actual web page. The service information page functions as a secondary lite web page and shares the traffic of the customers from the actual web page in case the seller has the actual web page. The service information page functions as a digital primary consolidated web page and coordinates, handles and monitors all digital commerce activities that are mandatory for running an online store in case the seller does not have the actual web page.

The business management function module 4028 automatically coordinates and manages at least one business management function digitally at backend based on at least one of transactions, the information obtained from the seller, and the business information. The at least one business management function comprises an inventory management function, human resource management function, employee management function, customer relationship management (CRM) function, payroll management function, supply chain management function, finance management function, promotions and advertisement management function, and shipping management function. The business management function module 4028 monitors the at least one business management. The business management function module 4028 dynamically updates the service information page of the business based on execution of the one or more business management functions, successful purchases, pending purchases, and unsuccessful purchases on the cloud. The business management function module 4028 keeps up to date at backend even when the respective business profile is not accessed.

The business management function module 4028 dynamically updates the service information page even when an action item of ecommerce is happening at backend i.e., not accessed in real time and only the action item of ecommerce is happening in background (e.g., the service information page is not active and displayed at screen). The computation happening at the service information page can happen at both active times and at passive times. The active time refers to a time when the service information page is currently accessed (e.g., real time access). The passive time refers to a time when the service information page is not currently accessed (i.e., the access has been done previously however the succeeding or subsequent action items happening at background). The updated service information page is rendered next time when the respective business profile is accessed later. The business management function module 4028 further updates inventory information, products available at hand, product pricing, product specification, new products arrived, product review, ratings, etc. at the front-end. By having the service information page capable of computing at both front-end and at backend, the service information page gets updated dynamically and next time when the user accesses, the updated service information page is rendered. This eliminates the need for the store owner to have the actual web page.

The business management function module 4028 comprises a supply chain module 4046, a customer relationship management (CRM) module 4048, an inventory module 4050, a human resource module 4052, a finance module 4054, and an employee management module 4056. The supply chain module 4046 monitors and tracks interactions, payments, purchases, pending purchases, etc. between the first seller and a secondary seller. The second seller may be the one who may supply or avail products/service from the first seller. For example, the second seller may be the one who is offering a transport service to the first seller to ship his/her goods. The supply chain module 4046 is also capable of tracking price of products, demand of products, price of raw materials, cost of transport, etc. The supply chain module 4046 tracks the demand of products based on booking requests received from the second users (e.g., customers, dealers, etc.). The supply chain module 4046 tracks the cost of transport based on fuel price around the date of transport of the shipment. The supply chain module 4046 provides suitable suggestions or recommendations to the first user based on the communications, tracking and analysis. The suggestions or recommendations comprise quantity of products to be manufactured, raw materials to be purchased, new machineries to be implemented, resources to be hired, etc.

The CRM module 4048 administers and analyses at least one of interactions, transactions, pending payments, successful payments, successful purchases, unsuccessful purchases, between the first user and customers to improve existing customer relationships and acquire new customers. The CRM module 4048 enables the seller to analyze and learn more about his/her target audiences and cater needs of the buyers. The CRM module 4048 also provides recommendations to the seller to provide offers to a buyer with respect to his/her business based on the analysis of at least one of the transactions, payments, purchases, interactions, frequency of purchases, quantity of purchases made by the customer.

The inventory module 4050 monitors and tracks the raw materials available at hand, products in which manufacturing is in progress, finished products (i.e., manufactured products) retuned products, products available at hand, products booked, successful payments, pending payments, etc. to keep track of the complete inventory details of the business. The inventory module 4050 enables the seller to view instantly and appropriately make a business decision based on the products available at hand at each stage (e.g., raw material stage, manufacturing in progress stage, finalized stage, ready to sell, etc.).

The human resource module 4052 manages and coordinates HR activities in the organization such as employee hiring, payroll processing, resource allocation, salary crediting, acquiring new business, analyzing resource requirement, etc. The human resource module 4052 enables the first user to manage employees conveniently and effortlessly. The finance module 4054 keeps track of the billings, revenues, pending payments, money invested, and the loan borrowed. The finance module 4054 further estimates the finance available at hand, profit, loss, payroll to be processed in the future etc. and provides suggestions accordingly to the seller.

The employee management module 4056 keeps track of the activities associated with employees in the business. The employee management module 4056 also monitors jobs executed by an employee, productivity of the employee, billable jobs, non-billable jobs, salary, revenue bought by the employee, etc. The employee management module 4056 also keeps track of leaves availed, leaves unused, leaves missed etc. The employee management module 4056 also keeps track of the list of leaves declared as holiday to the employees by the organization. The employee management module 4056 provides appropriate notifications to the employees prior to the scheduled holidays.

The chat box module 4026 enables interaction between one or more users (i.e., the first user, the second user, the one or more third users, the fourth user, etc.). The interaction comprises at least one of an audio interaction, a video interaction, and a text interaction. In an embodiment, the chat box module 4026 enables the interaction between the first user, and the second user. In another embodiment, the chat box module 4026 enables the interaction between the first users (e.g., merchants). In yet another embodiment, the chat box module 4026 enables the interaction between the second users (e.g., customers) to get at least one of opinion, review, comments about the performance of the product or the service purchased. In yet another embodiment, the chat box module 4026 enables the interaction between the first users (e.g., merchants) with subject to privacy. In yet another embodiment, the chat box module 4026 enables the interaction between at least two of the seller, the buyer, the transporter, and the passenger.

The input obtaining module 4014 further obtains scheduled travel event of at least one of a first transporter, and a second transporter of a town from a transporter profile database. The first transporter and the second transporter are the users who have registered as a carrier, a transporter, and/or a driver to transport goods or packages or passengers to a different town. The first transporter and the second transporter may also be the users who have registered to be a driver and accompany at least one passenger and their luggage. The itinerary information analysis module 4032 analyses travel plan of at least one of a passenger, the first transporter and the second transporter and communicates to the consignment assigning module. The itinerary information analysis module 4032 matches the itinerary information of the first transporter and the second transporter and shipping information of the one or more products and assigns shipping of the one or more products based on the matching.

The scheduled travel event comprises a carriable shipment volume, a carriable shipment weight, a carriable shipment quantity, a carriable shipment type, a travel date, a travel duration, accompaniers information, an origin location, one or more intermediary locations, a destination location, a mode of transport, vehicle information, a halt duration, a halt time, a travel route, an estimated departure time, and an estimated reach destination time. The carriable shipment type refers to at least one of perishable items shipment, non-perishable items shipment, odorless items shipment, bad-smelling items shipment, foldable items shipment, un-foldable items shipment, heavy material items shipment, fragile items shipment, heavy weight items shipment, light weight items shipment, etc. The itinerary information may also comprise a carriable weight and number of passengers that the driver could accommodate during the travel.

The shipping information of the one or more products comprise a shipping date, a shipping time, an origin location, one or more intermediary location, a destination location, a product weight, a product volume, a product type, an estimated reach destination time, an estimated departure time, a mode of transport, a vehicle information, a halt duration, a travel route, a mode of transport, etc. The itinerary information analysis module 4032 compares and matches the scheduled travel event (e.g., itinerary information, travel plan) and the shipping information. The consignment assigning module 4034 assigns a consignment of one or more products to the transporter when the scheduled travel event of the transporter matches the shipping information of the one or more products. For instance, when the transporter has the scheduled travel event of traveling from Mumbai to Chennai and similarly the one or more products ordered or purchased has to be shipped from Mumbai to Chennai on the same date and time of travel of the transporter, the consignment assigning module 4034 assigns the consignment to the transporter.

The consignment assigning module 4034 may assign a first half of consignment to the first transporter and a second half of the consignment to the second transporter when the itinerary information of the first transporter and the second transporter consolidated matches the shipping information of the one or more products. For instance, when the first transporter has the itinerary of traveling from Mumbai to Hyderabad and the second transporter has the itinerary of traveling from Hyderabad to Chennai. Similarly, the one or more products ordered or purchased has to be shipped from Mumbai to Chennai on the same date and time of travel, the consignment assigning module 4034 assigns the first half of the consignment from Mumbai to Hyderabad to the first transporter and the second half of the consignment from Hyderabad to Chennai to the second transporter. The consignment assigning module 4034 assigns the consignment based on matching the itinerary information and the shipping information and enables safe, quick, reliable, and secure shipping and delivery. In an embodiment, the consignment assigning module 4034 enables the user to select at least one shipping option such as express shipping, standard shipping, and optimum shipping. The express shipping renders transporters (e.g., a carrier travelling in a flight) who are expensive and are capable of shipping and delivering the at least one consignment at the earliest. The standard shipping renders transporters (e.g., a carrier travelling by road, train, ship, etc.) who are comparatively less expensive and are capable of shipping and delivering the at least one consignment in a standard time. The optimum shipping renders transporters (e.g., a carrier travelling by personal vehicle, etc.) who are optimum expensive and are capable of shipping and delivering the at least one consignment in an optimum time. In an embodiment, the consignment assigning module 4034 enables the passenger to log in the travel plan and search for the transporters manually. The consignment assigning module 4034 retrieves the list of transporters having travel plan identical to the travel plan of the transporters and travelling on the same date and time.

The consignment assigning module 4034 provides a first notification to the sender. The first notification is sent to the sender once the sender registers in and logs in the shipping information. The first notification comprises details of consignment assignment. The first notification also comprises a unique identifier, transporter details, and scheduled travel event of the transporter. The unique identifier may be one of a bar code, a quick response (QR) code, a RFID tag, etc. The transporter's detail comprises a popularity score (e.g., trustworthy score) associated with the transporter, scheduled travel event details of the transporter, mode of transport, etc. The first notification further may comprise a confirmation request. The confirmation request may request the sender's confirmation for assigning the shipping package to the transporter (i.e., manually allowing the sender to assign the consignment). The sender upon providing the confirmation, the consignment (e.g., the shipping package) is assigned to the transporter. In an embodiment, the confirmation request may also provide a list of suitable transporters and allow the sender to select the transporter among the list of transporters and provide confirmation. In another embodiment, the control circuit 4006 itself assigns the consignment to the transporter based on the matching and the popularity score associated with the transporter. The control circuit 4006 preferably assigns the consignment to the transporter who is having high popularity score.

The consignment assigning module 4034 then renders a second notification to the transporter. The second notification indicates assignment of consignment to the transporter. The second notification comprises a shipping package details, the shipping information, a recommendation, etc. The shipping package details comprise a shipping package size, a shipping package weight, a material type, a shipping package volume, etc. The shipping information comprises a mode of transport, an origin location, a destination location, one or more intermediary locations, a pickup date, a pickup time, a pickup location, a drop data, a drop time, a drop location, etc. The recommendation comprises a score indicating percentage of passing through the security check at the transport terminal. The transporter, upon receiving the notification, is expected to arrive at the pickup location at the scheduled pick up time to pick up the shipping package. In an embodiment, the consignment assigning module 4034 the renders a subsequent notification to another transporter if the transporter has not arrived at the right time and picked up the shipping package. The subsequent notification is similar to the second notification.

The sender, upon receiving the first notification, may communicate the unique identifier to the physical kiosk. In an embodiment, the sender communicates or shows the unique identifier to the physical kiosk or a representative of the physical kiosk. In another embodiment, the sender may print the unique identifier on a piece of paper (in a specified format) and paste it over the consignment (e.g., shipping package) while handing over the consignment to the physical kiosk.

The physical kiosk may have a sensor associated with it to read the unique identifier and recognize the identity of the shipping package. The physical kiosk upon recognizing the identity of the shipping package route the shipping package and stores it in the shipping package storage point. The physical kiosk secures the shipping package until the transporter approaches and collects the shipping package from the physical kiosk. The transporter may arrive at the pickup time at the pickup location and collect the shipping package. The transporter then executes his scheduled travel event along with the shipping package (e.g., hand carrying the shipping package (e.g., cabin baggage), or checked in baggage) and arrive at the destination location. The transporter upon arriving at the destination location may handover the shipping package (e.g., the consignment) to a second physical kiosk at the destination location. The second physical kiosk may read the unique identifier information associated with the consignment and recognizes the identity. The second physical kiosk then stores the consignment until a recipient approaches for the shipping package.

The itinerary information analysis module 4032, in an embodiment, analyses the itinerary information (e.g., scheduled travel event) of the transporter and the passenger. The itinerary information analysis module 4032 upon analyzing and identifying that the itinerary information of the transporter and the passenger matches, communicates a notification to the passenger. The notification may comprise details of the transporter and the passenger's travel event information and an action item for confirming the pooled trip. The consignment assigning module 4034 further assigns the pooled trip to the transporter and the passenger based on the matching. The consignment assigning module 4034 calculates a pick-up date, a pick-up time, a pick-up location, a drop time, a drop date, and a drop location that suits the transporter and the passenger based on the itinerary information of the transporter and the passenger. The consignment assigning module 4034 communicates the pick-up date, the pick-up location, the pick-up time, the drop date, the drop time, and the drop location to the transporter and the passenger upon confirmation of the pooled trip by the transporter and the passenger. In an embodiment, the pick-up date, a pick-up time, a pick-up location, a drop time, a drop date, and a drop location may be provided by the transporter and sent to the passenger for confirmation to set up the pooled trip.

In an embodiment, the popularity score estimation module 4038 also calculates a score to the transporter based on punctuality in pick-up, drop, departure time, destination time, and friendly behavior, etc. The punctuality in pick-up, drop, departure time, destination time can be determined by correlating a geographical positioning system (GPS) location of the transporter at respective times. Further the friendly behavior can be determined based on comments or opinions provided by the passenger based on one or more previous trips. The score calculated may help the passengers to select the transporter according to his/her requirement.

The contact list management module 4030 manages one or more contacts of the one or more users based on at least one of transactions, conversations, interactions, purchases, etc. The contact list management module 4030 further renders a profile of a contact of the one or more contacts subject to privacy or at least based on privileges granted to the user. The contact list management module 4030 further allows the one or more users to alter his/her contact list having the one or more contacts based on his/her preference. The contact list management module 4030 enables the one or more users (e.g., the transporters, the passengers, the sellers, the buyers, etc.) to manage one or more personal contacts and one or more business contacts.

In case of the seller, the contact list management module 4030 enables the seller to manage the contacts of buyers as well as the other sellers (e.g., secondary merchants who supply or buy products) isolated. For instance, consider the seller who is a bouquet shop owner and sells flowers bouquet, etc. The contact list management module enables the bouquet shop owner to manage the contacts of consumers who are one-time buyers, regular buyers, frequent buyers, non-regular buyers, etc. The contact list management module enables the bouquet shop owner to manage the contacts of secondary merchants who are dependent on the bouquet shop owner. The secondary merchants may be one who is supplying at least one of flowers, covers, wraps, flower baskets, etc. to the bouquet shop owner.

The universal shopping cart module 4036 renders price of the one or more products or services selected by the buyers. The price comprises cost of the products/services and the entire cost of shipping. The universal shopping cart module, in an embodiment, renders the price of the one or more products or services selected by the consumer based on the shipping options selected. The universal shopping cart module 4036 enables the one or more users to buy products or avail services from the one or more business profiles of different sellers and make a single consolidated payment. The universal shopping cart module 4036 controls shopping cart outside the one or more business profiles such that the payment is made to the host website (i.e., the ecommerce system) instead to the seller directly at the time of purchase. The universal shopping cart module 4036 keeps tracking the successful payments, pending payments, unsuccessful payments, the one or more products ordered, the one or more services availed, etc. from a merchant who has registered with the digital marketplace. The universal shopping cart module 4036 then automatically transacts, at a predefined time, the payment to be done to the merchant from the host. The predefined time may be a daily payment, a weekly payment, a monthly payment, etc.

The popularity score estimation module 4038 allows the one or more users to provide reviews, opinions, ratings, and feedback based on his/her experience or performance of the one or more products and the one or more services. The popularity score estimation module 4038 calculates a score or rating based on at least one of the reviews, opinions, ratings, and feedback provided. The popularity score estimation module 4038 further renders the score to the one or more products and the one or more services that may help the one or more users in purchasing.

The advertisement module 4040 is configured to render an advertisement of a second business profile within a first business profile and vice versa with subject to consent for advertisement given by the first business profile. The first business profile may be popular at least when compared to the second business profile. The customers who are viewing the first business profile may get to know business of the second business profile. The advertisement module 4040, in one embodiment, determines whether the seller (i.e., owner of the first business profile) has given consent for advertisement. The consent for advertisement may be obtained from the seller by the input obtaining module. The advertisement module 4040 enables the seller to get additional monetary benefits by giving the consent to advertisement within the first business profile. The advertisement module 4040 also renders a video tour of the business to at least one of the transporter, the passenger, and the buyer. The video tour educates regarding one or more business profiles, one or more products, and one or more services offered.

The status update module 4042 enables the one or more users to post a status update. The status update module 4042 further enables the one or more users to tag a contact from his/her contact list or a business profile in the status update and post his/her experience. The status update module 4042 further enables the one or more users tag a geolocation to the status update and post his/her experience. The status update module 4042 further enables the one or more users to describe his/her experience regarding at least one of the geolocation, the product, the service, the business profile, etc. The status update module 4042 further enables the one or more users (e.g., viewers) to provide his reactions via reaction icons to the status update. The reaction icons comprise icons such as like, dislike, thumbs up, thumbs down, share, comment, exclaim, smile, mock, claps, insightful, etc. The one or more users who are viewing the status update may get tempted upon seeing the status updates and would like to try that product/service or visit that geolocation which in turn is an indirect advertisement or promotion.

The post module 4044 renders the one or more status updates or posts that are posted on the digital marketplace to the one or more users. In an embodiment, the post module 4044 renders the one or more status updates or posts of the users who are in the contact list of the user. The post module 4044 notifies the one or more users when he/she gets tagged in the one or more status updates or posts. The post module 4044 notifies the one or more users when the user in his/her contact list made a comment, an opinion, a share, a like, a dislike, a thumbs up, etc. on the status updates.

In an embodiment, the control circuit 4006 may be a cloud server or a physical server located at a remote place. The control circuit 4006 enables users to interact with the ecommerce system through computing devices associated with the users. The control circuit 4006 comprises a networking module 4012 that enables interaction with the computing devices by exchanging information over a wireless communication network (e.g., Internet).

Figure 5:
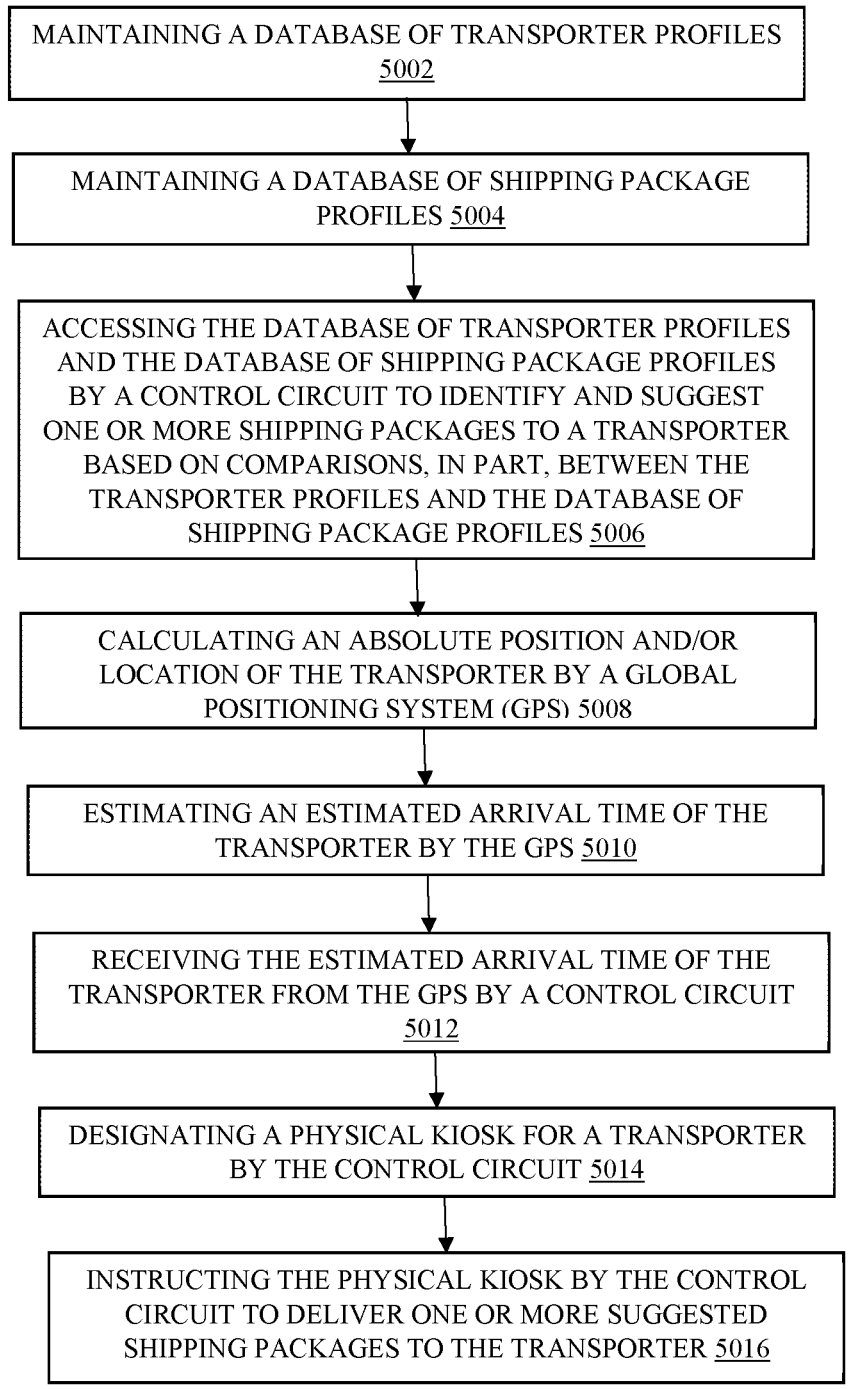
FIG. 5 illustrates a flowchart of assigning shipping consignments to transporters, according to some embodiments.

FIG. 5 illustrates a flowchart of assigning shipping consignments to transporters, according to some embodiments. At step 5002, a database of transporter profiles is maintained. The database of transporter profiles comprises one or more transporter profiles. At step 5004, a database of shipping package profiles is maintained. The database of shipping package profiles comprises one or more shipping profiles. At step 5006, the database of transporter profiles and the database of shipping package profiles are accessed by the control circuit to identify one or more suggested shipping packages for a transporter, in part, on comparisons between the one or more scheduled travel events of a transporter profile associated with the transporter and the one or more scheduled shipping events of the shipping packages. At step 5008, an absolute position and/or location of the transporter is calculated by a global positioning system. The absolute position and/or location of the transporter is calculated by tracking an absolute position of a transporter computing device associated with the transporter. In an embodiment, the absolute position and/or location of the transporter is calculated by tracking a sensor associated with the transporter. At step 5010, an estimated arrival time of the transporter at a transport terminal is estimated by the GPS.

At step 5012, the control circuit receives the estimated arrival time of the transporter from the GPS. The control circuit further receives recommendations regarding shipping packages from the physical kiosk. The recommendation indicates that whether the shipping package with go through and pass the security check. At step 5014, the control circuit designates a physical kiosk of one or more physical kiosks for a transporter based on availability of the one or more physical kiosks. At step 5016, the control circuit instructs the physical kiosk designated for the transporter to deliver one or more suggested shipping packages prior to the arrival of the transporter based on the recommendation.

Figure 6:
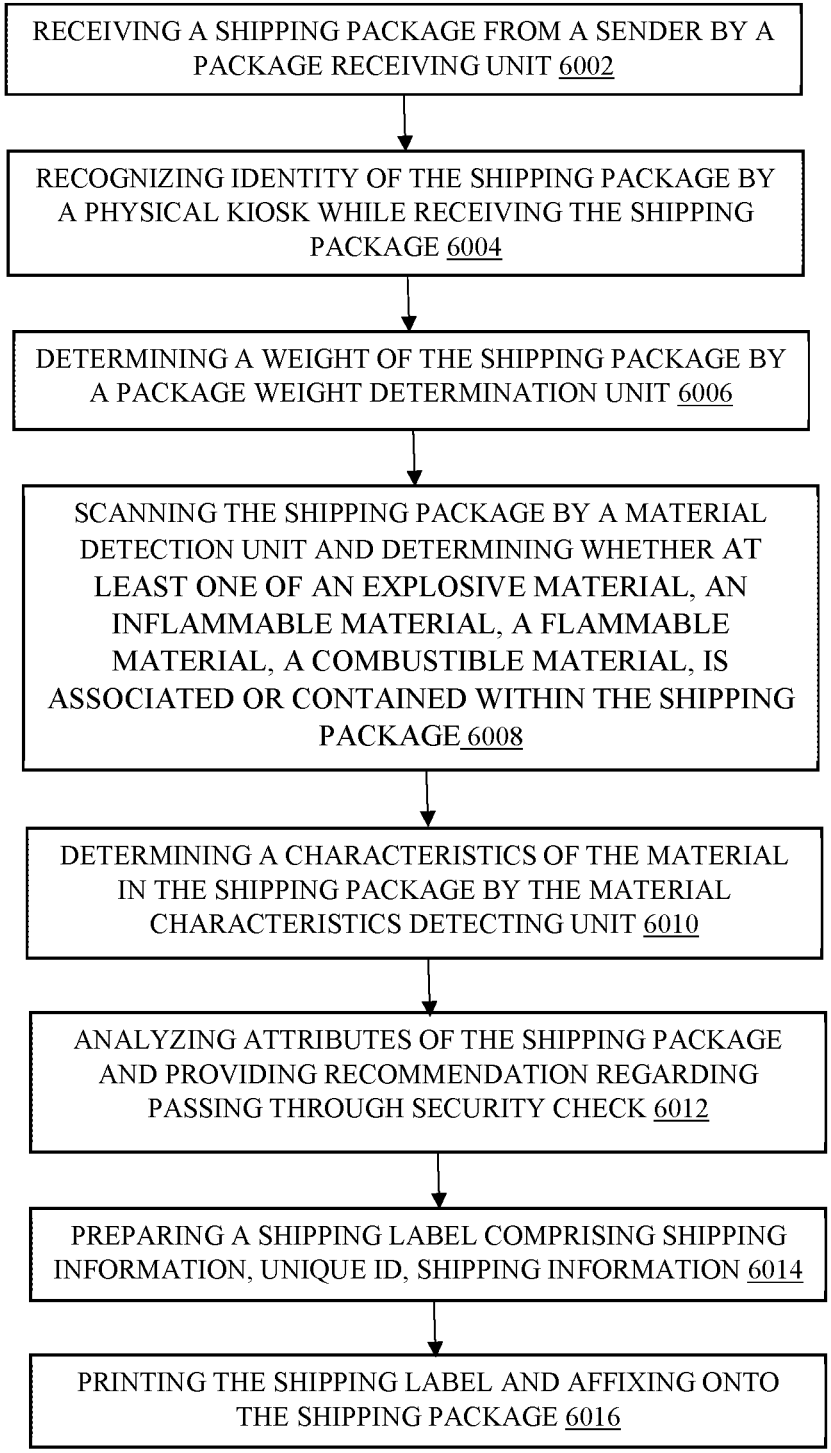
FIG. 6 illustrates a flowchart of security check verification performed by a physical kiosk according to some embodiments.

FIG. 6 illustrates a flowchart of security check verification performed by a physical kiosk according to some embodiments. At step 6002, a package receiving unit receives a shipping package via a conveyor belt from a sender. At step 6004, the physical kiosk recognizes identity of the shipping package while receiving the shipping package. The physical kiosk recognizes identity of the shipping package based on receipt time of the shipping package. The physical kiosk may also recognize identity of the shipping package based on reading a sensor information (e.g., bar code ID, radio frequency ID, etc.) from a sensor associated with the shipping package.

At step 6006, a package weight determination unit determines a weight of the shipping package. The package weight determination unit comprises at least one of a weighing scale, a weight sensor, and a load cell. At step 6008, a material detection unit scans the shipping package and determines whether at least one of an explosive material, an inflammable material, a flammable material, a combustible material, is associated or contained within the shipping package. At step 6010, a material characteristics detecting unit determines characteristics of the material in the shipping package. The material characteristics detecting unit further determines whether an item in the shipping package is at least one of fragile, non-fragile, transparent, brittle, ductile, liquid, hard, transparent, granular, spillable, and tensile.

At step 6012, a security verification unit analyses attributes the shipping package and provides a recommendation whether the shipping package passes through a security check at the transport terminal. The security verification unit provides the recommendation further based on comparing attributes (e.g., dimensions, weight, item type, characteristics, etc.) of the shipping package and prestored attributes of security check passed shipping packages. At step 6014, a shipping label preparing unit is operable to prepare a shipping label comprising shipping information. The shipping label may also comprise instructions that are to be followed while shipping the shipping package. The instructions comprise handle with care instructions. The shipping label preparing unit is capable of extracting shipping information of the shipping package from the database of shipping packages. In an embodiment, the control circuit may communicate the shipping information to the shipping label preparing unit for preparing the shipping label. At step 6016, a shipping label printing unit prints the shipping label and affixes the shipping label onto the shipping package.

Figure 7:
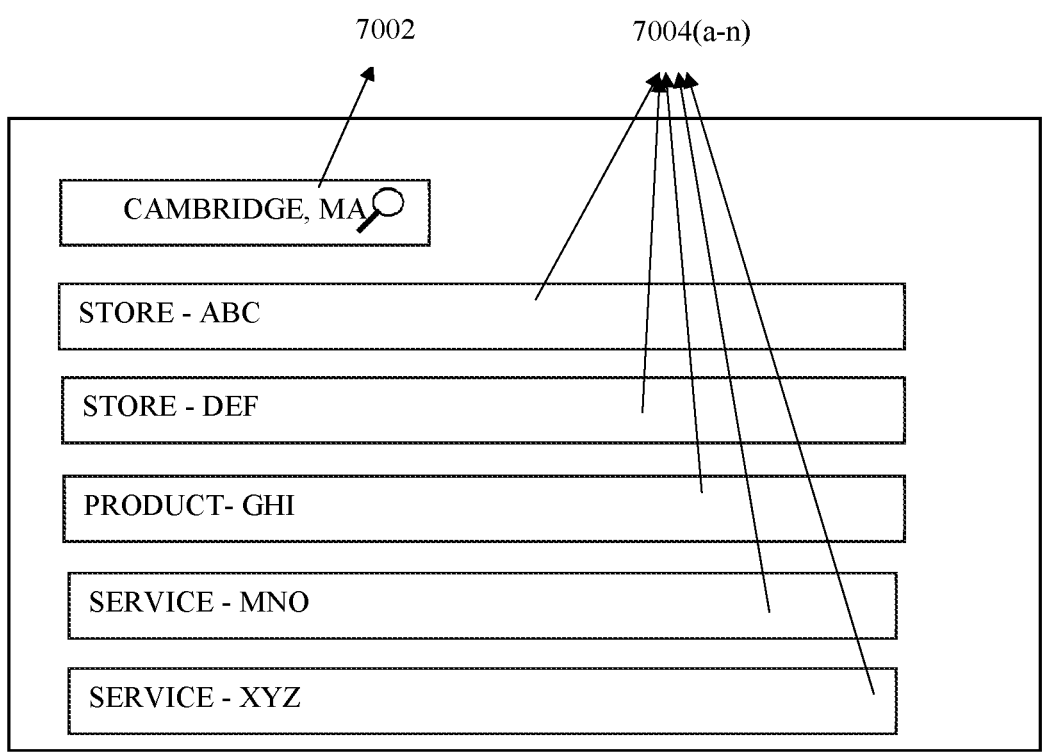
FIG. 7 illustrates a schematic user interface for performing a town-based search in an ecommerce system, according to some embodiments.

FIG. 7 illustrates a schematic user interface for performing a town-based search in an ecommerce system, according to one or more embodiments. The schematic user interface shown in FIG. 7 provides at least one search field 7002. The at least one search field 7002 comprises a town-based search field. The town-based search field receives at least one input as town name from a buyer (e.g., customer) who searches and retrieves at least one of a business profile, a product, and a service associated or located within the town. The control circuit upon receiving the town name as the at least one input renders a list of search retrievals 7004 (*a-n*). The list of search retrievals 7004 (*a-n*) comprises one or more business profiles, one or more products and one or more services from the town.

For instance, consider the customer prefers to view businesses located within a town "Cambridge, MA". Then the customer may provide the at least one input as name of the town. Upon receiving the at least one input as "Cambridge, MA", the control circuit renders one or more business profiles, one or more products and one or more services from the town Cambridge, MA The one or more business profiles rendered may have a look and feel, color, logo, structural aspects, etc. that are identical to a physical store in the town Cambridge, MA The identical features assist the customer to readily recognize and identify a business profile of a store which he/she may purchase or navigate menus. In an embodiment, the control circuit may enable the customer to provide inputs in more than one search field such as name, business type, geolocation, etc.

Figure 8:
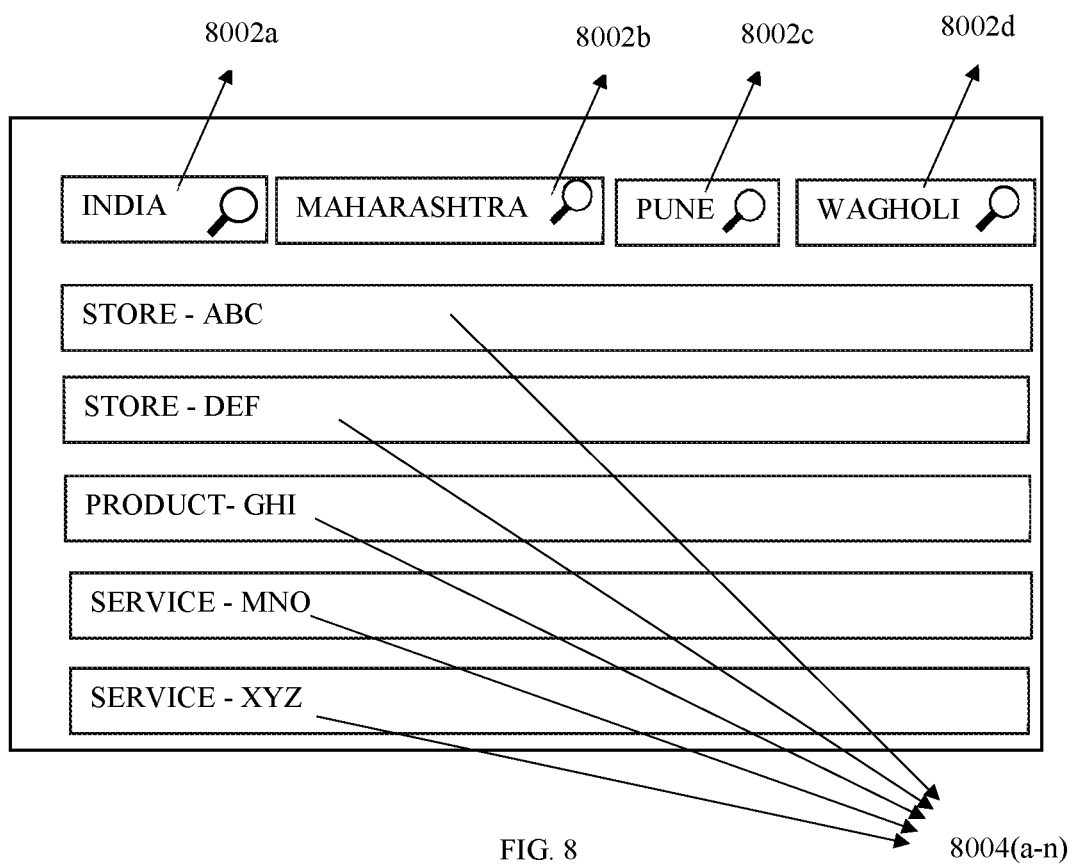
FIG. 8 illustrates a schematic user interface for performing a geolocation-based search in an ecommerce system, according to some embodiments.

FIG. 8 illustrates a schematic user interface for performing a geolocation-based search in an ecommerce system, according to one or more embodiments. The schematic user interface shown in FIG. 8 provides at least one search field 8002. The at least one search field 8002 may be a geolocation-based search field comprising at least one of a country-based search 8002*a*, a state-based search 8002*b*, a city-based search 8002*c*, and a town-based search field 8002*d*. The geolocation-based search field receives at least one input from a buyer (e.g., customer), ranging from a continent to a street, who looks to search and retrieve at one of a business profile, a product, and a service associated or located within the town. The control circuit upon receiving the at least one input renders a list of search retrievals 8004 (*a-n*). The list of search retrievals 8004 (*a-n*) comprises one or more business profiles, one or more products and one or more services from the geolocation.

For instance, consider the customer looking for a specific business. The customer remembers only country name and therefore may provide the at least one input as name of the country. Upon receiving the at least one input as "India", the control circuit renders a list of search retrievals comprising one or more business profiles, one or more products and one or more services within India. Let us consider, the list of search retrievals comprises a huge list. In that case, the customer is enabled to provide further inputs such as state name, a city name, and a town name to narrow down the huge list of retrievals to a tiny list where the customer can readily look for the specific business. The one or more businesses may have a look and feel, color, logo, structural aspects, etc. that are identical to a physical store of the business. These features assist the customer to readily recognize and identify a business profile which he/she may wish to purchase or navigate menus.

Figure 9:
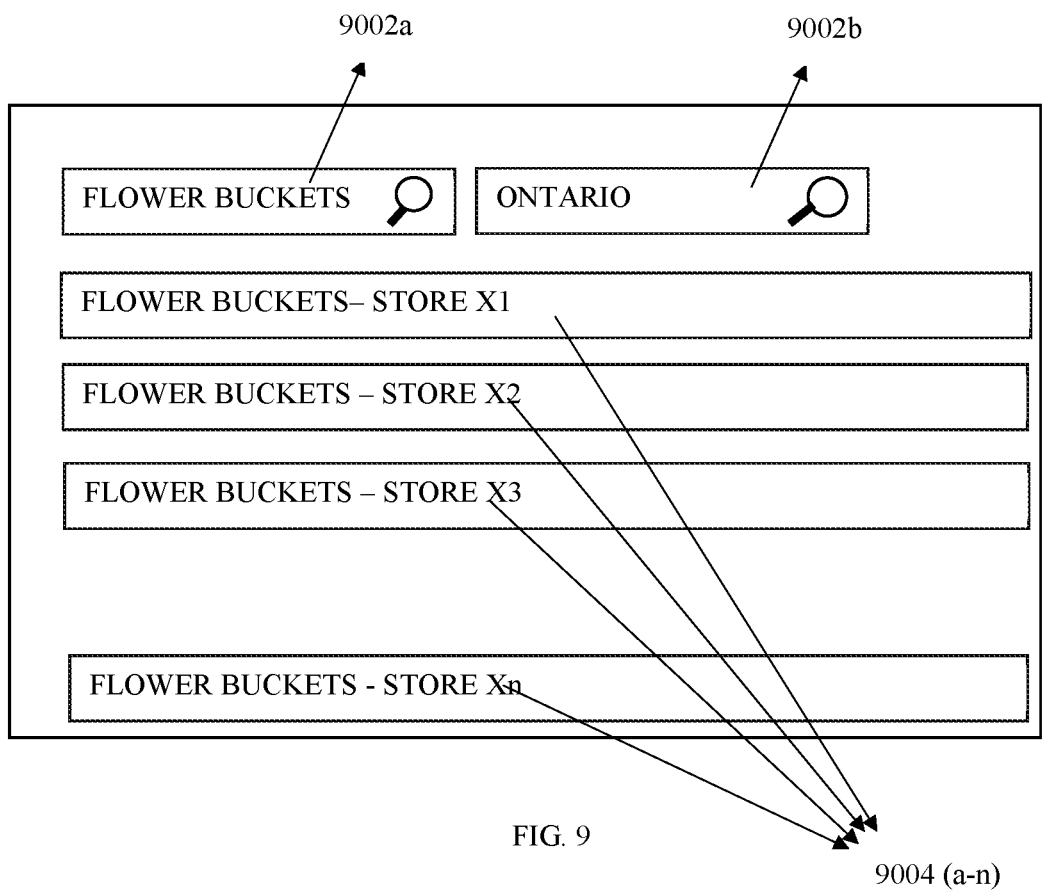
FIG. 9 illustrates a schematic user interface for searching a product in a geolocation, according to some embodiments.

FIG. 9 illustrates a schematic user interface for searching a product in a geolocation, according to one or more embodiments. The schematic user interface shown in FIG. 9 provides at least one search field 9002. The at least one search field 9002 may be a geolocation-based search field 9002b and a product-based search field 9002a. The geolocation-based search field 9002b receives at least one input from a second user (e.g., customer), ranging from a continent to a street, who wishes to search and retrieve a product associated or located within the geolocation. The product-based search field 9002a receives at least one input from the second user (e.g., customer) as a product name. The control circuit, upon receiving the at least one input on the geolocation-based search field 9002b and the product-based search field 9002a, renders a list of search retrievals 9004 (a-n). The list of search retrievals 9004 (a-n) comprises the one or more services from the geolocation.

For a first instance, consider the customer looking for a product "flower buckets" in a location named "Ontario". The control circuit enables the customer to provide inputs such as "flower buckets" in the product-based search field 9002a and "Ontario" in geolocation-based search field 9002b. The control circuit upon receiving the inputs searches and retrieves one or more products (i.e., flower buckets) sold by one or more stores from the town Ontario.

For a second instance, consider the customer has visited a town "Ontario" and looks for a "Flower buckets" which is famous in the town Ontario. The control circuit automatically identifies a location of the customer through a global positioning system (GPS) configured within a computing unit of the customer and updates as "Ontario" in geolocation-based search field 9002b. The control circuit further receives inputs such as "Flower buckets" from the customer in the product-based search field 9002a. The control circuit upon receiving the inputs searches and retrieves one or more products (i.e., flower buckets) offered for sale by one or more stores in the town Ontario.

Figure 10:
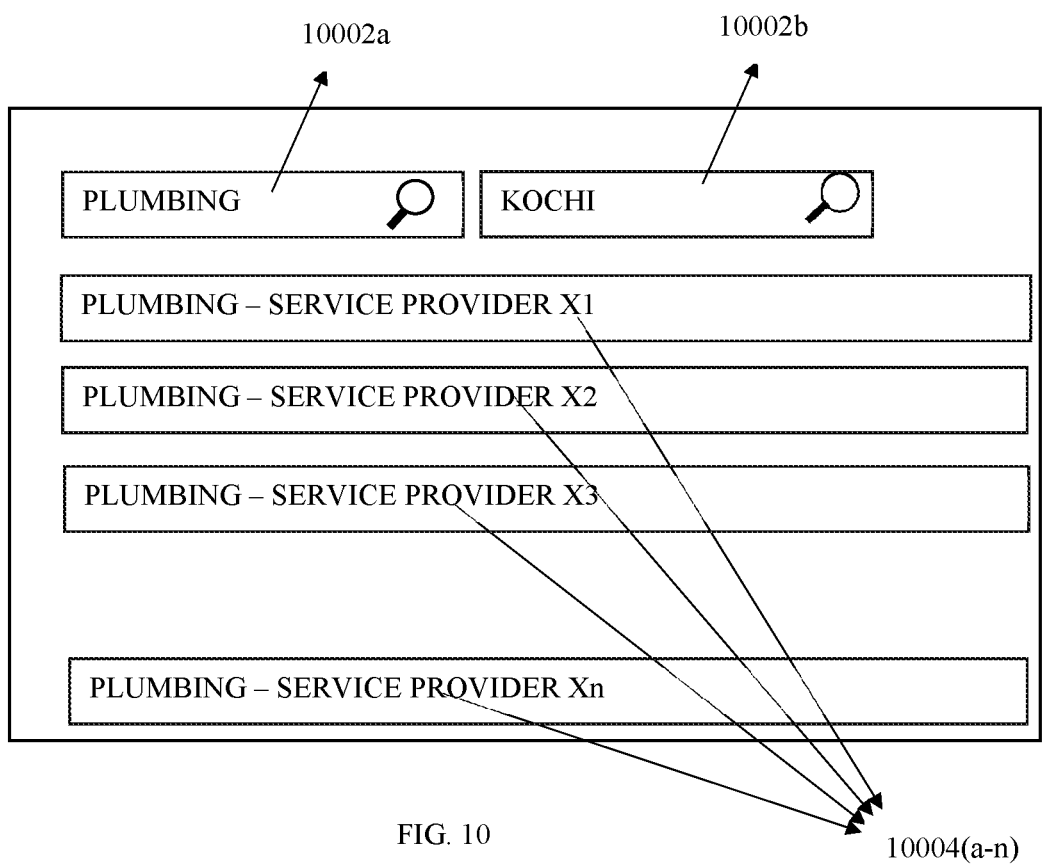
FIG. 10 illustrates a schematic user interface for searching a service in a geolocation, according to some embodiments.

FIG. 10 illustrates a schematic user interface for searching a service in a geolocation, according to one or more embodiments. The schematic user interface shown in FIG. 10 provides at least one search field 10002. The at least one search field 10002 may be a geolocation-based search field 10002b and a service-based search field 10002a. The geolocation-based search field 10002b receives at least one input from a second user (e.g., customer), ranging from a continent to a street, who wishes to search and retrieve a service associated or located within the geolocation. The service-based search field 10002a receives at least one input from the second user (e.g., customer) as a service name. The control circuit, upon receiving the at least one input on the geolocation-based search field 10002b and the service-based search field 10002a, renders a list of search retrievals 10004 (a-n). The list of search retrievals 10004 (a-n) comprises the one or more services from the geolocation.

For a first instance, consider the customer looking for a service "plumbing" in a city named "Kochi". The control circuit enables the customer to provide inputs such as "plumbing" in the service-based search field 10002a and "Kochi" in geolocation-based search field 10002b. The control circuit upon receiving the inputs searches and retrieves one or more services (i.e., plumbing services) sold by one or more service providers from the town (i.e., Kochi).

For a second instance, consider the customer has visited a city "Kochi" and looks for a "plumbing" service. The control circuit automatically identifies a location of the customer through a global positioning system (GPS) configured within a computing unit of the customer and updates as "Kochi" in geolocation-based search field 10002b. The control circuit further receives inputs such as "plumbing" in the service-based search field 10002a. The control circuit upon receiving the inputs searches and retrieves one or more services (i.e., plumbing services) offered by one or more service providers in the town (i.e., Kochi).

Figure 11:
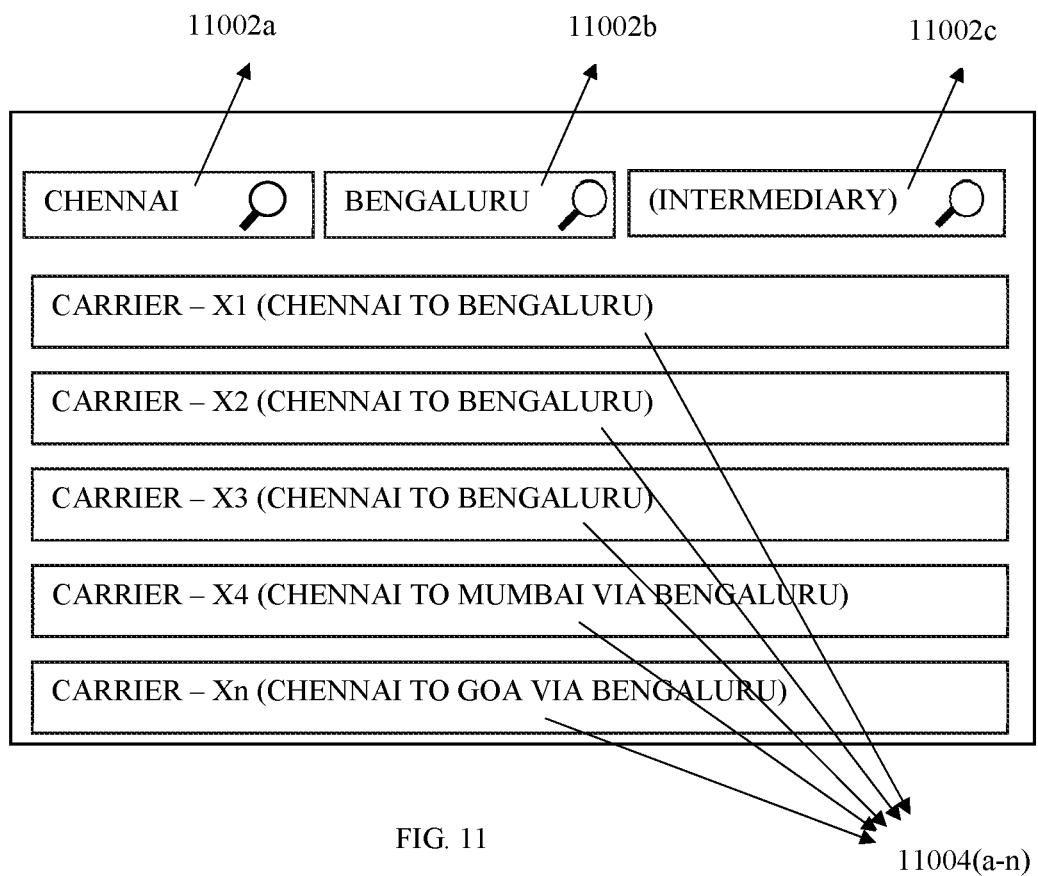
FIG. 11 illustrates a schematic view of a user interface for searching pooled transportation, according to some embodiments.

FIG. 11 illustrates a schematic view of a user interface for searching pooled transportation, according to one or more embodiments. The schematic user interface shown in FIG. 11 provides at least one search field 11002. The at least one search field 11002 may be an origin location search field 11002a, one or more intermediary location search fields 11002c, and a destination location search field 11002b. The at least one search field 11002 may also comprise a travel date search field and a travel time search field. The at least one search field 11002 receives at least one input from a second user (e.g., customer), ranging from a continent to a street and travel date, who wishes to search and retrieve at one of a pooled transport service provider at the travel date and travel time. The control circuit, upon receiving the at least one input, renders a list of search retrievals 11004 (a-n). The list of search retrievals 11004 (a-n) comprises the one or more pooled transport service providers who are travelling along the same travel route and on the same date. The pool transport service provider may be an owner of the vehicle who has a travel plan and a travel route as identical to a travel plan and a travel route of the customer at same date and more or less same time and has free space in his vehicles to accommodate at least one passenger along his travel.

For instance, consider the customer looking for a pooled transportation from Chennai to Bengaluru. The customer is enabled to provide inputs such as "Chennai" in the origin location search field 11002a and "Bengaluru" in the destination location search field 11002b. The control circuit upon receiving the inputs searches and retrieves one or more pooled transport service providers based on the at least one input provided. The control circuit also enables the customer to input the one or more intermediary locations.

The foregoing disclosure provides illustration and description, but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules, units may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., Complementary metal-oxide-semiconductor (CMOS) based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated circuitry (ASIC) and/or Digital Signal Processor (DSP) circuitry).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

INCORPORATION BY REFERENCE

All patents, patent application publications, and non-patent literature mentioned in the application are incorporated by reference in their entirety.
US20170032450A1 entitled "Virtual marketplace";
US20150287084A1 entitled "Systems and methods for implementing online marketplace for local merchants;
US20100262475A1 entitled "System and Method of Organizing a Distributed Online Marketplace for Goods and/or Services";
U.S. Ser. No. 10/783,480B1 entitled "Variable delivery zones for delivery orders":
WO2016060377A1 entitled "Product delivery processing method and product delivery processing server";
EP2162856A1 entitled "Online marketing platform";
US20190130462A1 entitled "Community Merchant Cross Selling/Promoting with Shared eCommerce Shopping Cart for Items Selected by Community Residents Incented to Conduct Transactions to Incent Community Donations";
US20200027109A1 entitled "Nested micro-marketplaces within an online marketplace";
U.S. Pat. No. 9,639,883B2 entitled "Method and system of displaying information related to items offered for sale in a network-based marketplace";
WO2014127444A1 entitled "Methods and systems for facilitating on-line commerce";
US20020049622A1 entitled "Vertical systems and methods for providing shipping and logistics services, operations and products to an industry";
EP2248087A1 entitled "Web system for providing an ecommerce storefront";
U.S. Pat. No. 7,614,552B2 entitled "Marketplace system that supports user-to-user sales via a definitive product catalog";
US20050209932A1 entitled "Interactive online marketplace system and method";
U.S. Pat. No. 9,390,103B2 entitled "Information searching method and system based on geographic location";
US20200042935A1 entitled "System-independent data logging";
U.S. Pat. No. 9,904,900B2 entitled "Systems and methods for on-demand transportation";
US20160364679A1 entitled "Systems and methods for on-demand transportation";
U.S. Pat. No. 7,013,589B2 entitled "Parcel shipping methods";
U.S. Ser. No. 10/332,060B2 entitled "Optimization of packaging sizes";
US20170220966A1 entitled "Method and System for On-Demand Customized Services";
US20150348111A1 entitled "Systems and methods for providing an online publishing platform";
U.S. Ser. No. 10/354,312B2 entitled "Electronic marketplace recommendations";
U.S. Pat. No. 7,614,552B2 entitled "Marketplace system that supports user-to-user sales via a definitive product catalog";
US20130006805A1 entitled "Online Marketplace for Collective Buying";
U.S. Pat. No. 6,738,975B1 entitled "Extensible distributed enterprise application integration system";
U.S. Pat. No. 8,285,571B2 entitled "Rideshare system and associated methodology";
U.S. Ser. No. 10/148,656B2 entitled "Securing shipment information accessed based on data encoded in machine-readable data blocks";
U.S. Pat. No. 9,092,817B2 entitled "Placing a purchase order using one of multiple procurement options"; and
U.S. Ser. No. 17/229,037 entitled "Digital Marketplace".

What is claimed is:

1. A system comprising:
a physical kiosk communicatively coupled to a control circuit and a geolocation device, the physical kiosk positioned at a transport terminal being designated for a transporter;
the control circuit configured to perform the steps of:
maintaining a database of transporter profiles, wherein the transporter profile comprises a scheduled travel event associated with the transporter;
maintaining a database of shipping package profiles, wherein the shipping package profile comprises a scheduled shipping event associated with a shipping package; and
accessing the database of transporter profiles and the database of shipping package profiles and matching the transporter profiles and the shipping package profiles via a matching algorithm to determine a suggested shipping package for the transporter, in part, on comparisons between the scheduled travel event of the transporter profile and the scheduled shipping event of the shipping package profile; and the geolocation device is operable to
- calculate in real-time an absolute position of a transporter computing device and estimate time of arrival of the transporter at the transport terminal; and
- communicate a signal to the physical kiosk to prepare for dispatch the suggested shipping package prior to the transporter arriving at the transport terminal.

2. The system of claim 1, wherein the control circuit comprises one of a microprocessor, a computer, and a processor based device.

3. The system of claim 1, wherein the physical kiosk comprises a disposal bin where the transporter deposits an unwanted suggested shipping package among the suggested shipping package, the disposal bin comprising a bin sensor operable to detect placement of the unwanted suggested shipping package.

4. The system of claim 1, further comprises a package support system and a package routing system communicatively coupled to the control circuit, the package support system operable to present the shipping package to the transporter.

5. The system of claim 3, wherein the control circuit is further operable to
- receive identification information of the unwanted suggested shipping package from the bin sensor; and
- update the database of transporter profiles based, in part, on the transporter associated with the transporter profile, on placing one of the unwanted suggested shipping package in the disposal bin.

6. The system of claim 1, wherein the control circuit is further operable to
- receive a package information query from the transporter computing device;
- match, via the matching algorithm, the transporter profiles and the shipping package profiles to determine the shipping package comprising package attributes corresponding to the package information query received; and
- instruct the physical kiosk to physically present the shipping package by loading the shipping package onto the physical kiosk by a retrieval device of an automated loading system, for physical presentation to the transporter at the transport terminal.

7. The system of claim 1, wherein the physical kiosk comprises
- a package receiving unit that receives the shipping package through a conveyor;
- a dimensions determination unit that captures an image of the shipping package and determines dimensions of the shipping package;
- a package weight determination unit that determines a weight of the shipping package;
- a material detection unit that scans the shipping package and determines whether at least one of an explosive material, an inflammable material, a flammable material, a combustible material, is at least one of associated and contained within the shipping package; and
- a security verification unit that analyses the shipping package and provides a recommendation whether the shipping package passes through a security check at the transport terminal.

8. The system of claim 7, wherein the dimensions determination unit determining the dimensions of the shipping package comprises
- identifying at least one of boundaries and edges of the shipping package from the image of the shipping package;
- calculating image coordinates from the boundaries and the edges identified;
- determining real world coordinates using the image coordinates; and
- determining the dimensions of the shipping package from the real world coordinates, wherein the dimensions of the shipping package comprise length, width, and height of the shipping package.

9. The system of claim 7, wherein the security verification unit is operable to
- retrieve attributes of the shipping package from the database of shipping package profiles, wherein the attributes comprise at least the dimensions, the weight, and a type of an item;
- compare prestored attributes and the attributes of the shipping package; and
- provide the recommendation whether the shipping package passes through the security check at the transport terminal.

10. The system of claim 1, wherein the system further comprises
- a database of business profiles, a business profile comprising at least one content related to a business of a seller; and
- the control circuit operable to access the database of business profiles.

11. The system of claim 10, wherein the control circuit is operable to
- obtain information from the seller, wherein the information is related to a business of the seller comprising a geolocation information, and at least one of a name, a business type, a logo, a business catalog, pricing information, preference information, business offers, web page information, and business information;
- create a business profile based on the information obtained from the seller, wherein the business profile comprise the at least one content related to the business;
- generate a service information page of the business based on the information obtained from the seller, the service information page is generated instantly when a buyer accesses the business profile of the business;
- record the business profile in the database of business profiles;
- record details of the seller and the buyer under an account of the seller and the buyer respectively; and
- render the service information page of the business to the buyer when the buyer accesses the business profile of the business.

12. The system of claim 11, wherein the geolocation information comprises a location of the business at one or more levels.

13. The system of claim 12, wherein the one or more levels comprises at least one of a continent level, a country level, a regional level, a state level, a city level, a district level, a town level, and a street level.

14. The system of claim 11, wherein the control circuit is further operable to:
- monitor a business management function of the business profile; and
- automatically coordinate and manage the business management function digitally at backend based on at least one of transactions, the information obtained from the seller, and the business information.

15. The system of claim 14, wherein the control circuit is further operable to:

dynamically update the service information page of the business based on the business management function; and render the service information page of the business to the buyer when the buyer accesses the business profile.

16. A method comprising:

designating a physical kiosk, positioned at a transport terminal, for a transporter;

maintaining a database of transporter profiles, wherein the transporter profile comprises a scheduled travel event associated with the transporter;

maintaining a database of shipping package profiles, wherein the shipping package profile comprises a scheduled shipping event associated with a shipping package;

accessing, via a control circuit, the database of transporter profiles and the database of shipping package profiles and matching the transporter profiles and the shipping package profiles via a matching algorithm to determine a suggested shipping package for the transporter, in part, on comparisons between the scheduled travel event of the transporter profile associated with the transporter and the scheduled shipping event of the shipping package profile;

calculating, via a geolocation device, in real-time an absolute position of a transporter computing device and estimate time of arrival of the transporter at the transport terminal; and communicating, via the geolocation device, a signal to the physical kiosk to prepare for dispatch the suggested shipping package prior to the transporter arriving at the transport terminal.

17. A non-transitory computer storage medium storing a sequence of instructions, which when executed by a processor, causes:

designating a physical kiosk, positioned at a transport terminal, for a transporter;

maintaining a database of transporter profiles, wherein the transporter profile comprises a scheduled travel event associated with the transporter;

maintaining a database of shipping package profiles, wherein the shipping package profile comprises a scheduled shipping event of a shipping package;

accessing, via a control circuit, the database of transporter profiles and the database of shipping package profiles and matching the transporter profiles and the shipping package profiles via a matching algorithm to determine a suggested shipping package for the transporter, in part, on comparisons between the scheduled travel event of the transporter profile associated with the transporter and the scheduled shipping event of the shipping package profile;

calculating, via a geolocation device, in real-time an absolute position of a transporter computing device and estimate time of arrival of the transporter at the transport terminal; and communicating, via the geolocation device, a signal to the physical kiosk to prepare for dispatch the suggested shipping package prior to the transporter arriving at the transport terminal.

\* \* \* \* \*